(12) United States Patent
Kumph

(10) Patent No.: US 12,547,919 B2
(45) Date of Patent: Feb. 10, 2026

(54) MULTI-MODE COUPLER FOR QUANTUM GATES

(71) Applicant: International Business Machines Corporation, Armonk, NY (US)

(72) Inventor: Muir Kumph, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 788 days.

(21) Appl. No.: 17/817,549

(22) Filed: Aug. 4, 2022

(65) Prior Publication Data
US 2024/0046132 A1 Feb. 8, 2024

(51) Int. Cl.
*G06N 10/40* (2022.01)
*H10N 60/12* (2023.01)

(52) U.S. Cl.
CPC ............. *G06N 10/40* (2022.01); *H10N 60/12* (2023.02)

(58) Field of Classification Search
CPC ................................ G06N 10/40; H10N 60/12
See application file for complete search history.

(56) References Cited

U.S. PATENT DOCUMENTS

| | | | |
|---|---|---|---|
| 6,518,673 B2 | 2/2003 | Herr et al. | |
| 7,268,576 B2 * | 9/2007 | Amin | B82Y 10/00 365/162 |
| 10,074,792 B1 | 9/2018 | Ferguson et al. | |
| 10,097,186 B1 | 10/2018 | Epstein et al. | |
| 10,134,972 B2 | 11/2018 | Oliver et al. | |
| 10,608,044 B1 | 3/2020 | Herr et al. | |

(Continued)

FOREIGN PATENT DOCUMENTS

| | | |
|---|---|---|
| CN | 112654970 A | 4/2021 |
| TW | 201327375 A | 7/2017 |

(Continued)

OTHER PUBLICATIONS

Moskaleno et al., Tunable coupling scheme for implementing two-qubit gates on fluxonium qubit, MISIS, Sep. 26, 2021, pp. 1-14 (Year: 2021).*

(Continued)

*Primary Examiner* — Nghia M Doan
(74) *Attorney, Agent, or Firm* — Amin, Turocy & Watson, LLP

(57) ABSTRACT

Techniques and couplers for managing coupling between qubits are presented. A coupler can be between, and connected to, a first qubit and second qubit. The coupler can comprise three Josephson junctions (JJs). The first and second JJs can be symmetrical, which facilitates creation of a first mode of oscillation and second mode of oscillation opposite of the first mode. Third JJ facilitates a division between the first and second modes. An activation status of a ZZ gate between the first and second qubits can be controlled based on excitation status of first mode and a relationship between first mode and second mode, the excitation status being based on whether a pulse is applied to the coupler. When no pulse is applied, ZZ gate is inactive and there is no coupling. When pulse is applied, first mode is in excited state activating ZZ gate, and there is a coupling between qubits.

25 Claims, 15 Drawing Sheets

(56) References Cited

U.S. PATENT DOCUMENTS

| | | |
|---|---|---|
| 11,108,380 B2 | 8/2021 | Keane |
| 2017/0193388 A1 | 7/2017 | Filipp et al. |
| 2021/0408112 A1* | 12/2021 | Finck .................. H03K 19/195 |
| 2021/0408113 A1* | 12/2021 | Finck ...................... H01P 3/003 |
| 2022/0180235 A1 | 6/2022 | Kumph et al. |

FOREIGN PATENT DOCUMENTS

| | | | |
|---|---|---|---|
| WO | 2015178991 A2 | 11/2015 | |
| WO | WO-2021178562 A1 * | 9/2021 | ............. G06N 10/20 |

OTHER PUBLICATIONS

Goto et al., Double-transmon coupler: Fast two-qubit gate with no-residual coupling for highly detuned superconducting qubits, Frontier Research Laboratory Mar. 22, 2022, p. 1-9 (Year: 2022).*

Finck et al., Suppressed crosstalk between two-junction superconducting qubits with mode-selective exchange coupling, https://arxiv.org/abs/2105.11495, Nov. 22, 2021, 7 pages.

International Search Report and Written Opinion received for PCT Application Serial No. PCT/EP2023/071151 dated Oct. 12, 2023, 10 pages.

Goto, Hayato, "Double-Transmon Coupler: Fast Two-Qubit Gate with No Residual Coupling for Highly Detuned Superconducting Qubits", Physical Review Applied, vol. 18, No. 034038, Sep. 15, 2022, 10 pages.

Office Action received for Taiwan Patent Application Serial No. 112115450 dated Dec. 20, 2023, 10 pages (Original Copy only).

* cited by examiner

MULTI-MODE COUPLER FOR QUANTUM GATES

BACKGROUND

The subject disclosure relates to quantum circuitry, and more specifically, to a multi-mode coupler for quantum gates. Quantum computers can comprise a group of qubits that can perform quantum operations on data. Quantum circuits can comprise qubits, Josephson junctions, couplers, resonators, capacitors (e.g., qubit shunt capacitors and/or other capacitors), inductors, waveguides, and/or other quantum circuit components, quantum circuit elements, or circuitry. A coupler can be utilized to enable qubit-to-qubit interactions or coupling between a pair of qubits via quantum logic gates. For instance, with regard to some existing coupling techniques, a capacitor can be between two transmon style qubits, wherein the capacitor can be utilized as a coupler. If the qubits are detuned from each other in the frequency space, the capacitor, acting as a coupler, can facilitate providing an always on ZZ coupling.

The above-described background description is merely intended to provide a contextual overview regarding quantum circuitry and couplers, and is not intended to be exhaustive.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, methods, apparatuses, and/or computer program products that can facilitate creating and/or utilizing couplers that can manage interactions and couplings between qubits are presented.

According to an embodiment, a device can comprise a first electronic element and a second electronic element. The device also can comprise a coupler component connected to the first electronic element and the second electronic element, wherein the coupler component can comprise a first Josephson junction, a second Josephson junction, and a third Josephson junction associated with the first Josephson junction and the second Josephson junction in a quantum circuit, and wherein, based on a relationship between the first Josephson junction, the second Josephson junction, and the third Josephson junction in the quantum circuit, the coupler component can have a first mode of oscillation and a second mode of oscillation. Such embodiment of the device can provide a number of advantages, including that the device can enhance the efficiency and reliability of coupling between electronic elements.

In some embodiments, a geometry between the first Josephson junction and the second Josephson junction in the quantum circuit can cause the first mode to have a first sign of coupling, and the second mode to have a second sign of coupling, with respect to the first electronic element and the second electronic element, and wherein the second sign can be opposite of the first sign. In certain embodiments, the first Josephson junction and the second Josephson junction can be substantially similar. The first Josephson junction can be located between a first capacitive pad and a third capacitive pad, the second Josephson junction can be located between a second capacitive pad and the third capacitive pad, and the third Josephson junction can be located between the third capacitive pad and a ground element. In some embodiments, a first frequency associated with the first mode or a second frequency associated with the second mode can be defined based on a parameter associated with the third Josephson junction and a geometry between the first Josephson junction, the second Josephson junction, and the third Josephson junction in the quantum circuit. Such embodiments of the device can provide a number of advantages, including that the device can desirably enhance the efficiency and reliability of coupling between electronic elements, increase the speed of activation of the coupler component and provide a desirably fast ZZ gate, and reduce the amount of power consumed in connection with the coupling of electronic elements.

According to another embodiment, a device can comprise a coupler component that can be associated with a first quantum component and a second quantum component. The coupler component can comprise a Josephson junction, and a resonator that can be associated with the Josephson junction, wherein the Josephson junction can be associated with a first mode of oscillation and the resonator can be associated with a second mode of oscillation. Such embodiment of the device can provide a number of advantages, including that the device can enhance the efficiency and reliability of coupling between quantum components.

In certain embodiments, the resonator can be a lambda/4-type resonator, where the first mode can be associated with a first sign of coupling and the second mode can be associated with a second sign of coupling with respect to the first quantum component and the second quantum component, and the second sign can be different from the first sign. Such embodiments of the device can provide a number of advantages, including that the device can desirably enhance the efficiency and reliability of coupling between quantum components, increase the speed of activation of the coupler component and provide a desirably fast ZZ gate, and reduce the amount of power consumed in connection with the coupling of quantum components.

According to still another embodiment, a method can comprise controlling excitation of a first oscillation mode of a coupler device based on whether a pulse is applied to the coupler device, where the coupler device can comprise the first oscillation mode and a second oscillation mode that can be in opposition to the first oscillation mode, and where the coupler device can be electrically connected between a first quantum component and a second quantum component. The method also can comprise controlling creation of a ZZ gate between the first quantum component and the second quantum component based on the controlling of the excitation of the first oscillation mode. Such embodiments of the method can provide a number of advantages, including that the method can enhance the efficiency and reliability of coupling between quantum components.

In some other embodiments, the method can comprise applying the pulse to the coupler device, and, in response to applying the pulse to the coupler device, creating the excitation of the first oscillation mode of the coupler device. The method further can comprise, in response to creating the excitation of the first oscillation mode, creating the ZZ gate between the first quantum component and second quantum component. In still other embodiments, the method can comprise, in response to no pulse being applied to the coupler device, a ZZ interaction or a coupling between the first quantum component and the second quantum component can be suppressed. Such other embodiments of the method can provide a number of advantages, including that the method can desirably enhance the efficiency and reliability of coupling between quantum components, increase the speed of activation of the coupler component and provide a desirably fast ZZ gate, and reduce the amount of power consumed in connection with the coupling of quantum components.

In accordance with yet another embodiment, a system can comprise a first qubit and a second qubit. The system also can comprise a coupler device that can be associated with the first qubit and the second qubit. The coupler device can comprise a first mode of oscillation and a second mode of oscillation. An activation status of a ZZ gate between the first qubit and the second qubit can be managed based on an excitation status of the first mode and a relationship between the first mode and the second mode, where the excitation status can be based on whether a pulse is applied to the coupler device. Such embodiment of the system can provide a number of advantages, including that the system can enhance the efficiency and reliability of coupling between qubits.

In some embodiments, the pulse can be a radio frequency pulse, where, in response to the radio frequency pulse being applied to the coupler device, the first mode can be excited. Based on the first mode being excited, the ZZ gate between the first qubit and the second qubit can be activated, which can enable a ZZ interaction or a coupling between the first qubit and the second qubit. In certain embodiments, in response to no pulse being applied to the coupler device, the first mode and the second mode can be in a non-excited state. Based on the first mode and the second being in the non-excited state, the ZZ gate can be inactive and a ZZ interaction or a coupling between the first qubit and the second qubit can be suppressed.

In certain embodiments, the coupler device can comprise a first Josephson junction, a second Josephson junction, and a third Josephson junction that can be associated with the first Josephson junction and the second Josephson junction in a circuit. The first mode and the second mode can be based on the first Josephson junction and the second Josephson junction being substantially symmetrical and based on a parameter associated with the third Josephson junction. Based on the first Josephson junction and the second Josephson junction being substantially symmetrical, the first mode can have a first sign of coupling and the second mode can have a second sign of coupling with respect to the first qubit and the second qubit, where the second sign can be opposite of the first sign.

In other embodiments, the coupler device can comprise a Josephson junction and a lambda/4-type resonator. The Josephson junction can be associated with the first oscillation mode, and the lambda/4-type resonator can be associated with the second mode. The first mode can be associated with a first sign of coupling and the second oscillation mode can be associated with a second sign of coupling with respect to the first qubit and the second qubit, where the second sign can be opposite from the first sign.

Such embodiments of the system can provide a number of advantages, including that the device can desirably enhance the efficiency and reliability of coupling between qubits, increase the speed of activation of the coupler component and provide a desirably fast ZZ gate, and reduce the amount of power consumed in connection with the coupling of qubits.

In accordance with still another embodiment, a system can comprise a coupler component that can be associated with a first electronic element and a second electronic element. The coupler component can comprise a first coupler element and a second coupler element. The coupler component can comprise a first mode associated with a first frequency and a second mode associated with a second frequency, where the second mode can have the ability to be in opposition to the first mode based on a relationship between the first coupler element and the second coupler element. Such embodiment of the system can provide a number of advantages, including that the system can enhance the efficiency and reliability of coupling between electronic elements.

These and other features will become apparent from the following detailed description of illustrative embodiments thereof, which is to be read in connection with the accompanying drawings.

DETAILED DESCRIPTION

Figure 1:
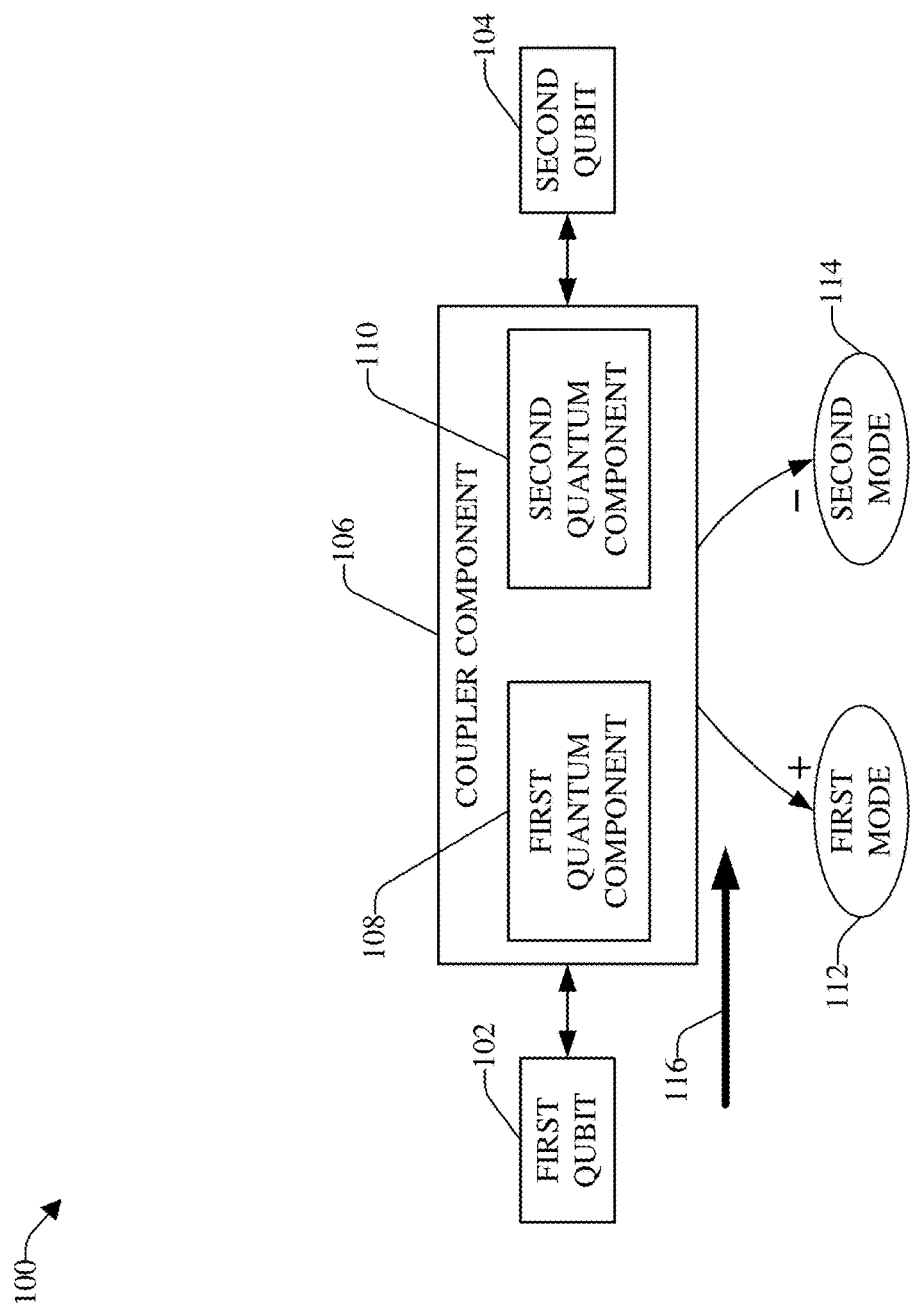
FIG. 1 illustrates a block diagram of an example, non-limiting system that can comprise a coupler component that can manage interaction or coupling between qubits, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computers can comprise a group of qubits that can perform quantum operations on data. In quantum circuits comprising qubits, a coupler can be utilized to enable qubit-to-qubit interactions or coupling between a pair of qubits to create quantum logic gates. For example, a capacitor can be between two transmon style qubits, wherein the capacitor can be utilized as a coupler. If the qubits are detuned from each other in the frequency space, the capacitor, acting as a coupler, can facilitate providing an always on ZZ coupling. Operating at sufficiently large qubit-qubit detunings, this always on coupling can be small enough to be usable, although such coupler can be undesirably inefficient. Further, a ZX (e.g., cross-resonance) or a ZZ (e.g., sizzle) gate can be activated using a suitable microwave drive.

Another existing technique for coupling qubits can involve when qubits are made flux-tunable. With flux-tunable qubits, the coupling between a pair of flux-tunable qubits can be tuned by changing the frequency of the qubits. Still another existing approach is to use a resonator as a coupler. By energizing the resonator, a resonator induced phase (RIP) gate can be performed between the pair of qubits.

Existing flux tuned gates typically can perform relatively better than existing microwave activated gates and existing RIP gates. Existing RIP gates can be relatively limited in performance due to having to drive the gates far detuned from the coupler frequency or due to having to use very long pulses to make near-detuned pulses. However, existing couplers and coupler approaches can be undesirably inefficient and/or otherwise lacking in performance, as such existing couplers can utilize an undesirable (e.g., inefficient, unsuitable, or suboptimal) amount of power, can have an undesirably slow activation that can result in slower gates, and/or can suffer from other types of deficiencies.

It can be desirable to enhance (e.g., increase, improve, or optimize) the efficiency, reliability, and performance of coupler components, and reduce the amount of power consumed in connection with the coupling of qubits. It also can be desirable to enhance the management of interactions and coupling between qubits. It further can be desirable to manage interactions and coupling between qubits without having to detune a coupler. It also can be desirable to increase the speed of activation of couplers and provide desirably fast gates for coupling.

The disclosed subject matter comprises coupler components and techniques that can have a number of advantages and can overcome the various deficiencies of existing couplers and coupling techniques. The disclosed coupler components and techniques for coupling of qubits can have enhanced efficiency, reliability, and performance, can enhance management of interactions and coupling between qubits, and can reduce the amount of power consumed in connection with managing the coupling of qubits, as compared to existing couplers and techniques. The disclosed coupler components and techniques for coupling of qubits can desirably manage the coupling of qubits without having to detune a coupler. The disclosed coupler components and techniques for coupling of qubits also can desirably increase the speed of activation of such coupler component and provide desirably fast gates for coupling, as compared to existing couplers and techniques.

To that end, various embodiments described herein relate to techniques for managing coupling between qubits. A coupler component can be between, and associated with (e.g., connected to), a first qubit and a second qubit in a quantum circuit. The coupler component can manage a ZZ gate, interactions, and/or coupling between the first qubit and second qubit. In certain embodiments, the qubits can be transmon qubits. A ZZ gate can relate to the frequency of one qubit being dependent upon the frequency state of another qubit, and whether that other qubit is energized or not. In other words, a ZZ gate can be where a frequency of one qubit can depend on the excited or energized state of the other qubit such that, if you excite one of the qubits, the frequency of the other qubit can change. There can be a symmetry with regard to a ZZ gate or ZZ interaction where, if you excite the first qubit, the frequency of the second qubit can change by a certain amount, and, if you instead excite the second qubit, the frequency of the first qubit can change by the same certain amount.

In some embodiments, the coupler component (e.g., a ZZ activated by pulse (ZZAP) coupler) can be a facemon coupler component that can comprise three Josephson junctions (JJs) that can be structured, designed, and/or arranged in the quantum circuit such that the first JJ and second JJ can be symmetrical, or at least substantially symmetrical, in relation to each other, wherein, due in part to the symmetry, or at least substantial symmetry, between the first JJ and second JJ, the coupler component can be associated with a first mode of oscillation and a second mode of oscillation, and wherein the third JJ can facilitate (e.g., enable or allow for) a division (e.g., split) between the first mode and second mode. For instance, the symmetry between the first JJ and second JJ can enable the modes of oscillation associated with the JJs of the coupler component to hybridize into two modes (e.g., first mode and second mode) of oscillation. The first mode can be an even mode and the second mode can be an odd mode (or vice versa) that can provide opposite signs of coupling (e.g., positive sign and negative sign of coupling, respectively) between the first qubit and second qubit (or between a first electronic element or component and a second electronic element or component, if the coupler component is situated between and associated with (e.g., connected to) the first electronic element or component and the second electronic element or component). The division between the first mode and second mode can be set, selected, adjusted, or determined based on the parameters (e.g., critical current, inductance, impedance, resistance, or other parameter) associated with the third JJ.

An activation status of a ZZ gate (e.g., a ZZAP gate) associated with the coupler component and qubits, and thereby a coupling between the first qubit and second qubit, can be controlled based on an excitation status of the first mode and a relationship between the first mode and the second mode (e.g., the first mode and the second mode can provide opposite signs of coupling). The excitation status can be based on whether a pulse (e.g., a radio frequency (RF) or pi-type pulse) is applied to the coupler component. When no pulse is applied to the coupler component, the first mode can be in a ground state, and, as a result, the ZZ gate can be in an inactive state and there can be no coupling between the first qubit and the second qubit. This can be because, when no pulse is applied, and the first mode and second mode both can be in the ground state, and due in part to the symmetry between the first mode and second mode, and the opposite signs of coupling associated with the first mode and second mode, the second mode can interfere with the first mode and can cancel out or suppress (e.g., squelch) coupling between the first qubit and the second qubit. When the pulse (e.g., pulse at a first frequency associated with the first mode) is applied to the coupler component (e.g., via a charge line in the quantum circuit), the first mode can be in an excited state, and, as a result, the ZZ gate can be in an active state and there can be a coupling between the first qubit and the second qubit. In other embodiments, the activation status of the ZZ gate, and thereby the coupling between the first qubit and second qubit, can be controlled based on whether the second mode is in an excited state (e.g., based on applying a pulse at a second frequency associated with the second mode) in relation to a ground state of the coupler component, rather than based on whether the first mode is in an excited state relative to the ground state of the ground.

In some embodiments, the coupler component can be tuneable such that one or more parameters (e.g., a frequency or other parameter) associated with the second JJ can be desirably tuned. For instance, the coupler component can comprise a fourth JJ that can be in parallel with the second JJ, and a wire component that can be in proximity to (e.g., within a defined distance of) the second JJ and the fourth JJ. One or more parameters associated with the second JJ can be tuned (e.g., modified, adjusted, or changed) based on a current (e.g., an amount of current) in the wire component and the proximity of the wire component to the second JJ and the fourth JJ (e.g., based on the amount of electromagnetic field provided to the second JJ and/or fourth JJ).

In certain embodiments, the coupler component can be an L4ZZAP coupler component that can comprise a JJ and a lambda (L)/4 resonator that can be arranged in parallel to each other in the quantum circuit where the JJ can be associated with a first mode of oscillation and the L/4 resonator can be associated with a second mode of oscillation. The first mode can be an even mode and the second mode can be an odd mode (or vice versa) that can provide opposite signs of coupling between the first qubit and second qubit.

The activation status of the ZZ gate associated with the coupler component and qubits, and thereby the coupling between the first qubit and second qubit, can be controlled based on the excitation status of the first mode and the relationship (e.g., opposing relationship) between the first mode and the second mode. The excitation status can be based on whether a pulse (e.g., RF or pi-type pulse) is applied to the coupler component. When no pulse is applied to the coupler component, the first mode can be in the ground state, and, as a result, the ZZ gate can be in an inactive state and there can be no coupling between the first qubit and the second qubit. This can be because, when no pulse is applied, the first mode and second mode both can be in the ground state, and due in part to the opposite signs of coupling associated with the first mode and second mode, the second mode associated with the L/4 resonator can interfere with the first mode associated with the JJ and can thereby cancel out or suppress coupling between the first qubit and the second qubit. When the pulse (e.g., pulse at a first frequency associated with the first mode) is applied to the coupler component (e.g., via a charge line in the quantum circuit), the first mode can be in the excited state, and, as a result, the ZZ gate can be in an active state (e.g., ZZ gate can be created) and there can be a coupling between the first qubit and the second qubit. In other embodiments, the activation status of the ZZ gate, and thereby the coupling between the first qubit and second qubit, can be controlled based on whether the second mode is in an excited state (e.g., based on applying a pulse at a second frequency associated with the second mode) in relation to the ground state of the ground, and the relationship between the first mode and the second mode, rather than based on whether the first mode is in an excited state relative to the ground state of the ground.

In some embodiments, the coupler component (e.g., L4ZZAP coupler component) can be tuneable such that one or more parameters (e.g., a frequency or other parameter) associated with the JJ can be desirably tuned. For instance, the coupler component can comprise a second JJ that can be in parallel with the JJ, and a coil component that can be in proximity to the JJ and the second JJ. One or more parameters associated with the JJ can be tuned based on a current in the coil component and the proximity of the coil component to the JJ and the second JJ.

These and other aspects and embodiments of the disclosed subject matter will now be described with respect to the drawings.

FIG. 1 illustrates a block diagram of an example, non-limiting system 100 that can comprise a coupler component that can manage interaction or coupling between qubits, in accordance with various aspects and embodiments of the disclosed subject matter. The system 100 can comprise various components and circuitry (e.g., quantum components and circuitry) that can be arranged to perform one or more desired functions, such as described herein. The system 100 can comprise or be part of, for example, a multi-qubit device or package that can have dimensions (e.g., the integrated circuit (IC) chip on which the system 100 can reside can have dimensions) that can vary, wherein the length of the device or package can range, for example, from on the order of millimeters to on the order of tens of millimeters, the width of the device or package can range, for example, from on the order of millimeters to on the order of tens of millimeters, and the thickness can range, for example, from approximately 1 millimeter (mm) to approximately 3 mm. It is to be appreciated and understood that these dimensions of the device or package are exemplary, and, in accordance with other embodiments, the device or package can have different (e.g., smaller or larger) dimensions than the example dimensions described herein.

In some embodiments, the system 100 can comprise a first qubit 102 and a second qubit 104 that can be formed as part of a quantum circuit, which can be formed on a chip stack formed on a die (e.g., IC chip). The first qubit 102 and second qubit 104 can be part of a group of qubits of a quantum computer (e.g., superconducting quantum computer). In certain embodiments, the first qubit 102 and second qubit 104 can be transmon qubits, although, in other embodiments, the first qubit 102 and second qubit 104 can be a different type of qubit. The first qubit 102 and second qubit 104 each can comprise, for example, one of more Josephson junctions and a shunt capacitor that can be associated with the one or more Josephson junctions.

It can be desired (e.g., wanted) to manage (e.g., control) interactions or couplings between qubits, such as the first qubit 102 and second qubit 104 (or between a first electronic element or component and a second electronic element or component). In accordance with various embodiments, the system 100 can comprise a coupler component 106 that can enable and manage interactions and coupling between the first qubit 102 and second qubit 104. The coupler component 106 can be situated between (e.g., logically or physically between) the first qubit 102 and second qubit 104 in the quantum circuit. One end (e.g., a first port or lead) of the coupler component 106 can be associated with (e.g., connected to) the first qubit 102, and another end (e.g., a second port or lead) of the coupler component 106 can be associated with (e.g., connected to) the second qubit 104. The coupler component 106 can enable qubit-to-qubit interactions (e.g., interactions between the first qubit 102 and second qubit 104) that can allow for quantum logic gates. It is to be appreciated and understood that, while some embodiments are described herein with regard to a coupler component between two qubits, in accordance with various other embodiments, a coupler component can be between, and connected to, a first electronic element or component (e.g., a quantum element or component) and a second electronic element or component of an electronic circuit (e.g., quantum circuit) for which management of coupling between the first electronic element or component and second electronic element or component is desired (e.g., wanted).

In accordance with various embodiments, the coupler component 106 can be a type of ZZAP coupler. In some embodiments, the coupler component 106 can be a facemon coupler component, which can be a multi-JJ coupler, such as more fully described herein. In other embodiments, the coupler component 106 can be an L4ZZAP coupler, which can employ a JJ and an L/4 resonator, such as more fully described herein. In certain embodiments, the coupler component 106 can be a tuneable coupler component that can enable one or more parameters (e.g., frequency, or another desired parameter) associated with the coupler component 106 to be desirably tuned (e.g., modified, adjusted, or changed), such as more fully described herein.

The coupler component 106 can comprise a first quantum component 108 (e.g., a first JJ) and a second quantum component 110 (e.g., a second JJ or an L/4 resonator). In certain embodiments, the coupler component 106 can comprise other components (e.g., a third JJ, one or more capacitors, one or more inductors, or another type of component), such as described herein. The first quantum component 108 and the second quantum component 110 can be structured, designed, and/or arranged in the quantum circuit in relation to each other such that multiple modes of oscillation can be created, where the multiple modes can comprise a first mode of oscillation 112 and a second mode of oscillation 114. The first mode 112 can be an even mode and the second mode 114 can be an odd mode (or vice versa) that can provide opposite signs of coupling between the first qubit 102 and second qubit 104 (or between the first electronic element or component and the second electronic element or component). For instance, the first mode 112 can be associated with (e.g., can provide) a first sign of coupling (e.g., positive sign of coupling), and the second mode 114 can be associated with a second sign of coupling (e.g., negative sign of coupling) that can be opposite of the first sign. In certain embodiments, the first quantum component 108 (e.g., first JJ) and the second quantum component 110 (e.g., second JJ) can be symmetrical, or at least substantially symmetrical, in relation to each other to facilitate creating the opposing modes (e.g., the first mode 112 and the second mode 114 that can provide opposite signs of coupling).

The coupler component 106 can desirably (e.g., suitably, enhancedly, or optimally) manage a gate, such as a ZZ gate, between the first qubit 102 and second qubit 104 to facilitate desirably managing interactions and coupling between the first qubit 102 and second qubit 104. The ZZ gate (e.g., a ZZAP gate) can have an activation status that can comprise an inactive state (e.g., closed gate) or active status (e.g., open gate). The activation status of the ZZ gate, and thereby a coupling, between the first qubit 102 and second qubit 104 can be controlled based on an excitation status of the first mode 112 and the relationship between the first mode and the second mode 114 (e.g., the opposite signs of coupling associated with the first mode 112 and second mode 114). The excitation status can be based on whether a pulse (e.g., an RF or pi-type pulse) is applied to the coupler component 106 via a charge line 116, which can be located in or in proximity to (e.g., within a defined distance of) the coupler component 106 in the quantum circuit. When no pulse is applied to the coupler component 106, the first mode 112 and the second mode 114 both can be in a ground state, and, as a result, the ZZ gate can be in the inactive state and there can be no coupling between the first qubit 102 and the second qubit 104. This can be because, when no pulse is applied to the coupler component 106, the first mode 112 and second mode 114 both can be in the ground state, and due in part to the relationship between the first mode 112 and the second mode 114, the second mode 114 can interfere with the first mode 112 and can cancel out or suppress (e.g., squelch or inhibit) coupling between the first qubit 102 and the second qubit 104. When the pulse (e.g., RF or pi-type pulse at a first frequency associated with the first mode 112)

is applied to the coupler component 106 via the charge line 116 (e.g., by supplying a desired voltage or current to the charge line 116), the first mode 112 can be in an excited state, and, as a result, the ZZ gate can be in the active state, and the coupler component 106 can enable there to be a coupling between the first qubit 102 and the second qubit 104. In other embodiments, the activation status of the ZZ gate, and thereby the coupling between the first qubit 102 and second qubit 104, can be controlled based on whether the second mode 114 is in an excited state (e.g., based on applying a pulse at a second frequency associated with the second mode 114) relative to the ground state of the ground associated with the coupler component 106, and the relationship between the first mode 112 and the second mode 114, rather than based on whether the first mode 112 is in an excited state relative to the ground state of the ground.

The coupler component 106 can thereby desirably (e.g., suitably, enhancedly, or optimally) manage coupling between the first qubit 102 and the second qubit without having to utilize flux tuned gates and without having to utilize microwave activated gates with always on couplings.

Figure 2:
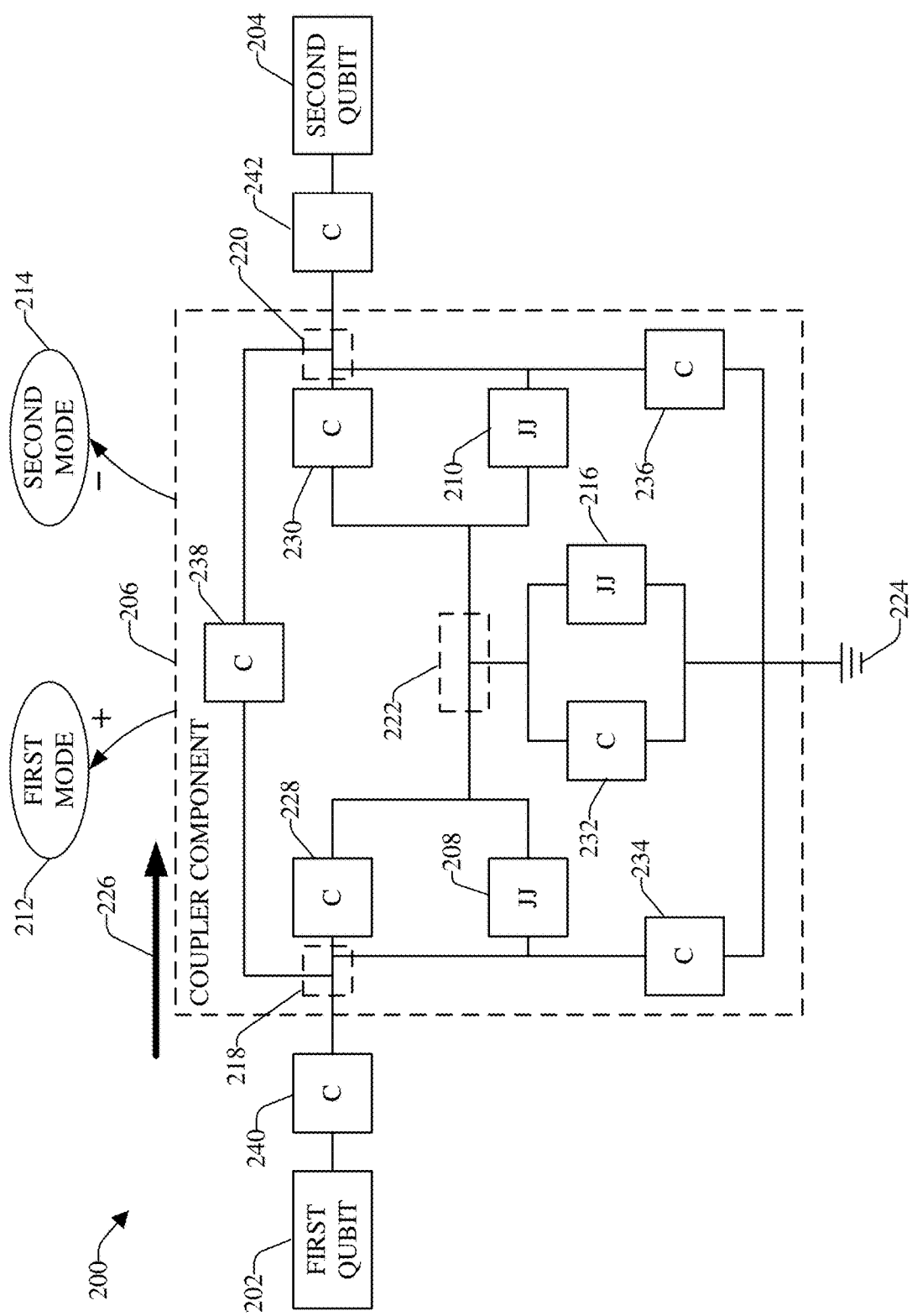
FIG. 2 depicts a schematic diagram of an example, non-limiting system that can comprise a coupler component (e.g., a facemon coupler component) that can employ a multi-Josephson junction arrangement, and can manage interaction or coupling between qubits, in accordance with various aspects and embodiments of the disclosed subject matter.
Figure 3:
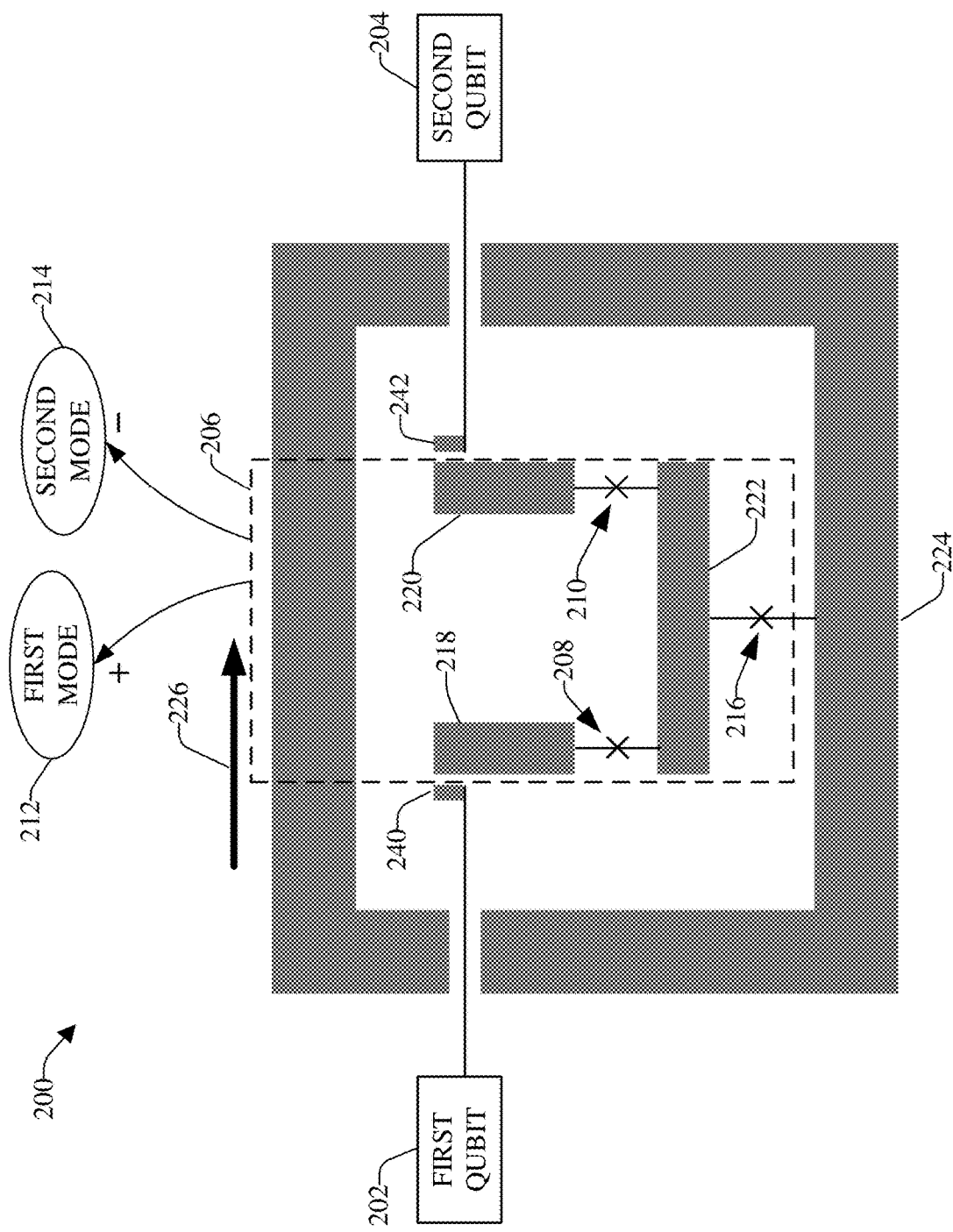
FIG. 3 depicts a diagram (e.g., a quantum circuit layout diagram) of an example, non-limiting system that can comprise a coupler component that can employ a multi-Josephson junction arrangement, and can manage interaction or coupling between qubits, in accordance with various aspects and embodiments of the disclosed subject matter.

FIGS. 2 and 3 depict diagrams of an example, non-limiting system 200 that can comprise a coupler component (e.g., a facemon coupler component) that can employ a multi-JJ arrangement, and can manage interaction or coupling between qubits, in accordance with various aspects and embodiments of the disclosed subject matter. FIG. 2 depicts a schematic diagram of the non-limiting example system 200, and FIG. 3 depicts a diagram (e.g., a quantum circuit layout diagram) of the non-limiting example system 200. The system can comprise various components and circuitry (e.g., quantum components and circuitry) that can be arranged to perform one or more desired functions, such as described herein. The system 200 can comprise a first qubit 202 and a second qubit 204. In some embodiments, the first qubit 202 and second qubit 204 can be transmon qubits. In other embodiments, the first qubit 202 and second qubit 204 can a different type of qubit.

In accordance with various embodiments, the system 200 can comprise a coupler component 206 that can enable and manage interactions and coupling between the first qubit 202 and second qubit 204 (or between a first electronic element or component and a second electronic element or component in the circuit, if the coupler component 206 is situated between and associated with (e.g., connected to) the first electronic element or component and the second electronic element or component). The coupler component 206 can be situated between (e.g., logically or physically between) the first qubit 202 and second qubit 204 in the quantum circuit. One end (e.g., a first port or lead) of the coupler component 206 can be associated with (e.g., connected to) the first qubit 202, and another end (e.g., a second port or lead) of the coupler component 206 can be associated with (e.g., connected to) the second qubit 204.

In some embodiments, the coupler component 206 can be a facemon coupler component that can comprise three JJs that can be structured, designed, and/or arranged in the quantum circuit such that the first JJ 208 and second JJ 210 can be symmetrical, or at least substantially symmetrical, in relation to each other, wherein, due in part to the symmetry, or at least substantial symmetry, between the first JJ 208 and second JJ 210, the coupler component 206 can be associated with a first mode of oscillation 212 and a second mode of oscillation 214, and wherein the third JJ 216 can facilitate (e.g., enable or allow for) a division (e.g., split) between the first mode 212 and second mode 214, such as described herein. In certain embodiments, instead of using the third JJ 216, an inductor can be utilized to facilitate (e.g., enable or allow for) a division between the first mode 212 and second mode 214. The first mode 212 can be associated with a first frequency that can be on the order of gigahertz (GHz) (e.g., 5.5 GHz or other frequency greater or less than 5.5 GHz), and the second mode 214 can be associated with a second frequency that also can be on the order of gigahertz (e.g., 6.0 GHz or other frequency greater or less than 6.0 GHz), but can be different from the first frequency. In some embodiments, the first JJ 208, second JJ 210, and/or third JJ 216 can be fixed frequency JJs, although, in other embodiments, the first JJ 208, second JJ 210, and/or third JJ 216 can have adjustable (e.g., tuneable) frequencies.

The first mode 212 can be an even mode and the second mode 214 can be an odd mode (or vice versa) that can provide opposite or different signs of coupling (e.g., positive sign and negative sign of coupling, respectively) between the first qubit 202 and second qubit 204. In some embodiments, to facilitate the symmetry and the creation of the opposing modes (e.g., the first mode 212 and the second mode 214 having opposite signs of coupling with respect to the first qubit 202 and second qubit 204), the first JJ 208 and second JJ 210 can be nominally or substantially identical to each other. For instance, the capacitances, inductances, critical currents, impedances, and/or resistances associated with the first JJ 208 and second JJ 210 can be the same or substantially the same (e.g., when the coupler component 206 is in the ground state). In operation, the first JJ 208 and second JJ 210 can act or behave like non-linear inductors. As a result, when the first JJ 208 (or second JJ 210) is driven on resonance, the first JJ 208 (or second JJ 210) can gain energy and excite, where, if it continues to be driven on resonance, it can de-excite and the energy can leave the first JJ 208 (or second JJ 210). This can be in contrast to a linear resonator, where, if you drive a linear resonator on resonance, the linear resonator can continue to gain more and more energy. The symmetry, or at least substantial symmetry, between the first JJ 208 and second JJ 210 can enable the coupler component 206 (e.g., the first JJ 208 and the second JJ 210 of the coupler component 206) to hybridize into the two modes (e.g., first mode 212 and second mode 214) of oscillation that can be opposing (e.g., even mode and odd mode). As a result, the first mode 212 and second mode 214 can balance each other out, and can thereby cancel out, or at least substantially cancel out (e.g., suppress), interaction or coupling between the first qubit 202 and second qubit 204, when the first mode 212 and second mode 214 are in the ground state.

The division between the first mode 212 and second mode 214 can be set, selected, adjusted, or determined based on the parameters (e.g., critical current, inductance, impedance, resistance, or other parameter) associated with the third JJ 216, where different parameters for the third JJ 216 can result in different divisions between the first mode 212 and second mode 214 (e.g., can result in different respective frequencies or other respective parameters associated with the first mode 212 and second mode 214). For instance, based on the parameters associated with the third JJ 216, the third JJ 216 can facilitate tuning, adjusting, or setting the first frequency associated with the first mode 212, the second frequency associated with the second mode 214, and/or the frequency space between the first mode 212 and second mode 214 (e.g., can facilitate tuning, adjusting, or setting the separation between the first frequency associated with the first mode 212 and the second frequency associated with the second mode 214).

The quantum circuit can comprise a number of pads, including pad 218, pad 220, and pad 222. The pads 218, pad 220, and pad 222 can be formed of a desired conductive (e.g., superconductive) material. In the quantum circuit, respective ends (e.g., respective leads or ports) of the first JJ 208 can be associated with (e.g., connected to) the pad 218 and pad 222, and respective ends of the second JJ 210 can be associated with (e.g., connected to) the pad 220 and pad 222. Also, in the quantum circuit, an end of the third JJ 216 can be associated with (e.g., connected to) the pad 222 to connect the third JJ 216 to the first JJ 208 and second JJ 210, wherein the other end of the third JJ 216 can be associated with the ground 224 (e.g., quantum circuit ground).

The coupler component 206 can desirably (e.g., suitably, enhancedly, or optimally) manage a gate, such as a ZZ gate, between the first qubit 202 and second qubit 204 to facilitate desirably managing interactions and coupling between the first qubit 202 and second qubit 204. The coupler component 206 can control the activation status of the ZZ gate (e.g., ZZAP gate), and thereby can control an interaction or a coupling between the first qubit 202 and second qubit 204, based on an excitation status of the first mode 212 in relation to the ground state of the ground 224, and the relationship between the first mode 212 and the second mode 214 (e.g., the opposite signs of coupling associated with the first mode 212 and the second mode 214). The excitation status can be based on whether a pulse (e.g., an RF or pi-type pulse) is applied to the coupler component 206 via a charge line 226, which can be located in or in proximity to (e.g., within a defined distance of) the coupler component 206 (e.g., located in or near the qubit pocket, and in proximity to the third JJ 216 or another component) in the quantum circuit. In some embodiments, excitation of the first mode 212 and/or the second mode 214 can be based on the collective excitations of the first JJ 208, second JJ 210, and third JJ 216 in response to the pulse being applied to the coupler component 206. Conversely, when no pulse is applied to the coupler component 206, there can be a lack of excitation of the first mode 212 and second mode 214 due to the collective lack of excitation of the first JJ 208, second JJ 210, and third JJ 216 in response to no pulse being applied.

When no pulse is applied to the coupler component 206, the first mode 212 can be in a ground state, and, as a result, the ZZ gate can be in an inactive state and there can be no coupling, or at least close to no coupling, between the first qubit 202 and the second qubit 204. This can be because, when no pulse is applied to the coupler component 206 via the charge line 226, the first mode 212 and second mode 214 both can be in the ground state, and due in part to the symmetry, or at least substantial symmetry, between the first mode and second mode, and the opposite signs of coupling associated with the first mode 212 and second mode 214, the second mode 214 can interfere with the first mode 212 and can cancel out, or at least substantially (and suitably or sufficiently) cancel out, coupling between the first qubit 202 and the second qubit 204.

When the charge line 226 applies a pulse (e.g., RF or pi-type pulse at the first frequency associated with the first mode 212) to the coupler component 206 based on a desired voltage or current supplied to the charge line 226, the first mode 212 can be in an excited state, which can create an imbalance between the first mode 212 and the second mode 214, and, as a result, the coupler component 206 can control the ZZ gate to transition the ZZ gate from the inactive state to the active state and, as a result, there can be an interaction or coupling between the first qubit 202 and the second qubit 204. The coupler component 206 desirably can be driven resonantly or diabatically with an on-resonant pulse to activate the ZZ interaction or coupling between the first qubit 202 and second qubit 204. This can be in contrast to some existing couplers and techniques that have to use an off-resonant adiabatic drive to activate the ZZ interaction or coupling between qubits. As a result of the coupler component 206 being able to be driven resonantly or diabatically with the on-resonant pulse to activate the ZZ interaction or coupling between the first qubit 202 and second qubit 204, the coupler component 206 desirably can be activated significantly quicker for significantly faster gates, as compared to the existing couplers and techniques. Also, the coupler component 206 can desirably control interactions and coupling between the first qubit 202 and second qubit 204 without the coupler component 206 having to be in an always on state, which can desirably reduce the amount of power utilized by the coupler component 206 to manage interactions and coupling between the first qubit 202 and second qubit 204 (e.g., as compared to existing couplers, such as always on couplers). Further, because the coupler component 206 can be non-linear, the coupler component 206 can be driven with a pi-type (e.g., pi, 2 pi, pi/2, pi/4, or other pi-type pulse) or RF pulse that desirably can use a relatively low amount of power, which also can enhance (e.g., improve, increase, or optimize) the efficiency of the coupler component 206, as compared to existing couplers.

It is to be appreciated and understood that, in other embodiments, the activation status of the ZZ gate, and thereby the coupling between the first qubit 202 and second qubit 204, can be controlled based on whether the second mode 214 is in an excited state (e.g., based on applying a pulse at the second frequency associated with the second mode 214) in relation to the ground state of the ground 224, and the relationship between the first mode 212 and the second mode 214, rather than based on whether the first mode 212 is in an excited state relative to the ground state of the ground 224.

In certain embodiments, the coupler component 206 can comprise a third mode of oscillation that can be associated with the third JJ 216. If desired (e.g., wanted), the activation status of the ZZ gate, and thereby coupling between the first qubit 202 and second qubit 204, can be controlled based on whether the third mode of oscillation is in an excited state. For instance, the ZZ gate can be transitioned from the inactive state to the active state (e.g., the ZZ gate can be turned on) by exciting the third mode of oscillation, for example, based on applying a pulse at a third frequency associated with the third mode of oscillation to the coupler component 206. It is noted though that the speed of a ZZ gate associated with excitation of the first mode 212 or second mode 214 typically can be faster than the speed of a ZZ gate associated with excitation of the third mode of oscillation.

In some embodiments, the coupler component 206 can be structured to be associated with one or more frequencies that are above the frequencies associated with the first qubit 202 and second qubit 204. In other embodiments, the coupler component 206 can be structured to be associated with one or more frequencies that are below the frequencies associated with the first qubit 202 and second qubit 204.

In certain embodiments, the system 200 can comprise other components, including, for example, capacitor (C) 228, capacitor 230, capacitor 232, capacitor 234, capacitor 236, capacitor 238, capacitor 240, and/or capacitor 242, which can be arranged in the quantum circuit, such as depicted in FIG. 2. The capacitor 228 can be connected in parallel to the first JJ 208, and respective ends of the capacitor 228 can be connected to the pad 218 and pad 222. The capacitor 230 can be connected in parallel to the second JJ 210, and respective ends of the capacitor 230 can be connected to the pad 220 and pad 222. The capacitor 232 can be connected in parallel to the third JJ 216, and respective ends of the capacitor 232 can be connected to the pad 222 and ground 224. The capacitor 234 can have one end (e.g., lead or plate) connected to the first JJ 208, and the other end of the capacitor 234 can be connected to the ground 224. The capacitor 236 can have one end (e.g., lead or plate) connected to the second JJ 210, and the other end of the capacitor 236 can be connected to the ground 224. The capacitor 238 can have one end (e.g., lead or plate) connected to the pad 218 (and other components connected to the pad 218), and the other end of the capacitor 238 can be connected to the pad 220 (and other components connected to the pad 220). In some embodiments, the capacitor 240 (e.g., capacitive coupler) can be (e.g., optionally can be) positioned between and connected to the pad 218 and the first qubit 202 at respective ends of the capacitor 240, and the capacitor 242 (e.g., capacitive coupler) can be (e.g., optionally can be) positioned between and connected to the pad 220 and the second qubit 204 at respective ends of the capacitor 242.

Figure 4:
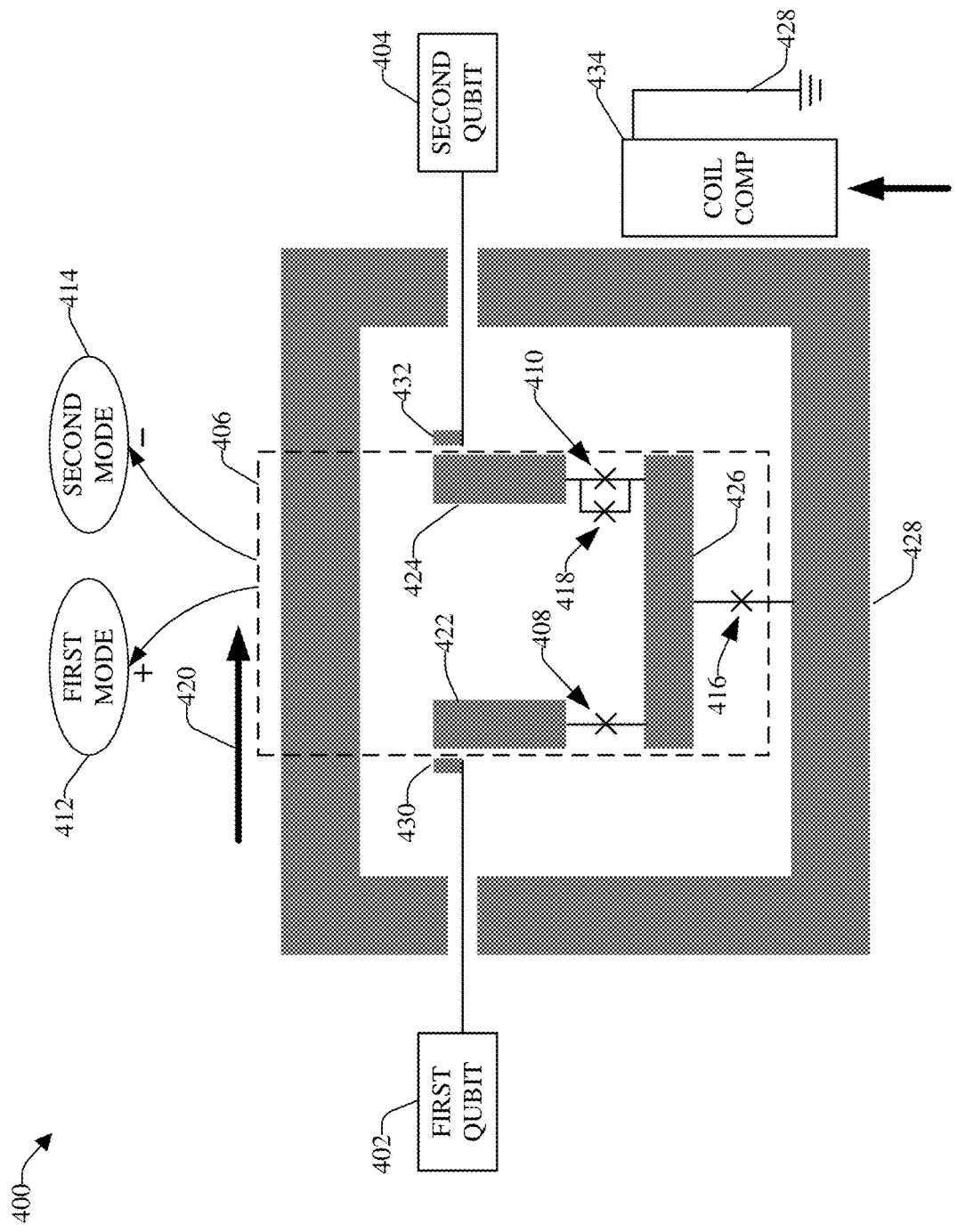
FIG. 4 illustrates a diagram of an example, non-limiting system that can comprise a tuneable coupler component that can employ a multi-Josephson junction arrangement, and can manage interaction or coupling between qubits, in accordance with various aspects and embodiments of the disclosed subject matter.

FIG. 4 illustrates a block diagram of an example, non-limiting system 400 that can comprise a tuneable coupler component (e.g., tuneable facemon coupler component) that can employ a multi-Josephson junction arrangement, and can manage interaction or coupling between qubits, in accordance with various aspects and embodiments of the disclosed subject matter. The system 400 can comprise a first qubit 402 and second qubit 404. In some embodiments, the first qubit 402 and second qubit 404 can be transmon qubits, or, in other embodiments, the first qubit 402 and second qubit 404 can a different type of qubit.

In accordance with various embodiments, the system 400 can comprise a coupler component 406 that can enable and manage interactions and coupling between the first qubit 402 and second qubit 404 (or between a first electronic element or component and a second electronic element or component in the circuit, if the coupler component 406 is situated between and associated with (e.g., connected to) the first electronic element or component and the second electronic element or component). The coupler component 406 can be situated between (e.g., logically or physically between) the first qubit 402 and second qubit 404 in the quantum circuit. One end (e.g., a first port or lead) of the coupler component 406 can be associated with (e.g., connected to) the first qubit 402, and another end (e.g., a second port or lead) of the coupler component 406 can be associated with (e.g., connected to) the second qubit 404.

In some embodiments, the coupler component 406 can be a tuneable facemon coupler component that can comprise four JJs that can be arranged in the quantum circuit such that the first JJ 408 and second JJ 410 can be symmetrical, or at least substantially symmetrical, in relation to each other, wherein, due in part to such symmetry, the coupler component 406 can be associated with a first mode of oscillation 412 and a second mode of oscillation 414, and wherein the third JJ 416 can facilitate a division between the first mode 412 and second mode 414, such as described herein. The first mode 412 can be an even mode and the second mode 414 can be an odd mode (or vice versa) that can provide opposite or different signs of coupling between the first qubit 402 and second qubit 404. In some embodiments, the first JJ 408 and second JJ 410 can be nominally or substantially identical to each other, which can enable such symmetry between the first JJ 408 and second JJ 410. In certain embodiments, the system 400 can comprise a fourth JJ 418 that can be connected in parallel to the second JJ 410 to facilitate tuneability of the coupler component 406, such as described herein.

The system 400 also can comprise a charge line 420 that can be located in or in proximity to (e.g., within a defined distance of) the coupler component 406 in the quantum circuit. A pulse (e.g., an RF or pi-type pulse) can be selectively applied to the coupler component 406 via the charge line 420 to facilitate controlling the excitation status of the first mode 412 (or the excitation status of the second mode 414) to facilitate controlling the activation status of the ZZ gate associated with the coupler component 406, which can facilitate controlling interaction or coupling between the first qubit 402 and second qubit 404, such as described herein. The coupler component 406 can operate in a same or similar manner as, for example, the coupler component 206 of FIGS. 2 and 3, and described herein, except that the coupler component 406 can be tuneable, such as more fully described herein.

The quantum circuit of the system 400 also can comprise a number of pads, including pad 422, pad 424, and pad 426. The pads 422, pad 424, and pad 426 can be formed of a desired conductive (e.g., superconductive) material. In the quantum circuit, respective ends (e.g., respective leads or ports) of the first JJ 408 can be associated with (e.g., connected to) the pad 422 and pad 426, and respective ends of the second JJ 410 can be associated with (e.g., connected to) the pad 424 and pad 426. Also, in the quantum circuit, an end of the third JJ 416 can be associated with (e.g., connected to) the pad 426 to connect the third JJ 416 to the first JJ 408 and second JJ 410, wherein the other end of the third JJ 416 can be associated with the ground 428. In some embodiments, the quantum circuit of the system 400 can comprise (e.g., optionally can comprise) capacitors that can act as capacitive couplers, wherein pad 430 can be, or can be associated with, a capacitor that can act as a capacitive coupler to couple the first qubit 402 to the coupler component 406, and wherein pad 432 can be, or can be associated with, a capacitor that can act as a capacitive coupler to couple the second qubit 404 to the coupler component 406.

In certain embodiments, to facilitate enabling the coupler component 406 to be desirably tuned, the quantum circuit of the system 400 also can comprise a coil component (COIL COMP) 434 that can be formed or located in proximity to (e.g., within a defined distance of) the second JJ 410 and fourth JJ 418. The coil component 434 can comprise a desired number of windings (e.g., one winding, or multiple windings), or can comprise a wire component (e.g., a superconductive wire) that can be a coil with a single winding. When it is desired to tune the second JJ 410, a desired current can be supplied to the coil component 434, and the current in the coil component 434 can generate (e.g., create) a magnetic flux. The amount of magnetic flux generated can be based on the amount of current in the coil component 434 (e.g., the amount of current sent down the coil or wire of the coil component 434), and the amount of flux applied to the second JJ 410 and fourth JJ 418 can be based on the amount of flux generated by the coil component 434 and the proximity of the coil component 434 to the second JJ 410 and the fourth JJ 418. Due in part to the fourth JJ 418 connected in parallel to the second JJ 410, and the coil component 434 being in proximity to the second JJ 410 and fourth JJ 418, one or more parameters (e.g., frequency or another parameter) associated with the second JJ 410 can be tuned (e.g., modified, adjusted, or changed lower or higher) based on the magnetic flux generated by the coil component 434.

The coupler component 406 to be tuned for a number of reasons. For example, during fabrication of the coupler component 406, the first JJ 408 and second JJ 410 potentially may not be sufficiently identical to each other, which can result in the first mode 412 and second mode 414 not being sufficiently opposite of each other and not sufficiently canceling out interaction or coupling between the first qubit 402 and second qubit 404 when the coupler component 406 is in the ground state. In such case, one or more parameters, such as the frequency, associated with the second JJ 410 can be desirably tuned (e.g., adjusted) to enable the second JJ 410 to be identical, or at least substantially and sufficiently close to being identical, to the first JJ 408 to enable the first mode 412 and second mode 414 to be sufficiently opposite of each other and sufficiently cancel out or suppress interaction or coupling between the first qubit 402 and second qubit 404 when the coupler component 406 is in the ground state.

As another example of utilizing the tuneable coupler component 406, the coupler component 406 can be employed to facilitate creating a flux gate (e.g., flux ZZ gate) where, based on a current supplied to the coil component 434 to facilitate adjusting the frequency of the second JJ 410 to a different frequency, the frequency of the second JJ 410 can be adjusted to the different frequency to facilitate placing the second mode 414 out of balance with the first mode 412. Adjusting the frequency associated with the second JJ 410 and/or second mode 414 to facilitate placing the second mode 414 out of balance with the first mode 412 can result in the ZZ gate being transitioned from the inactive state to activated state, and a desired interaction or coupling between the first qubit 402 and second qubit 404 can occur.

Figure 5:
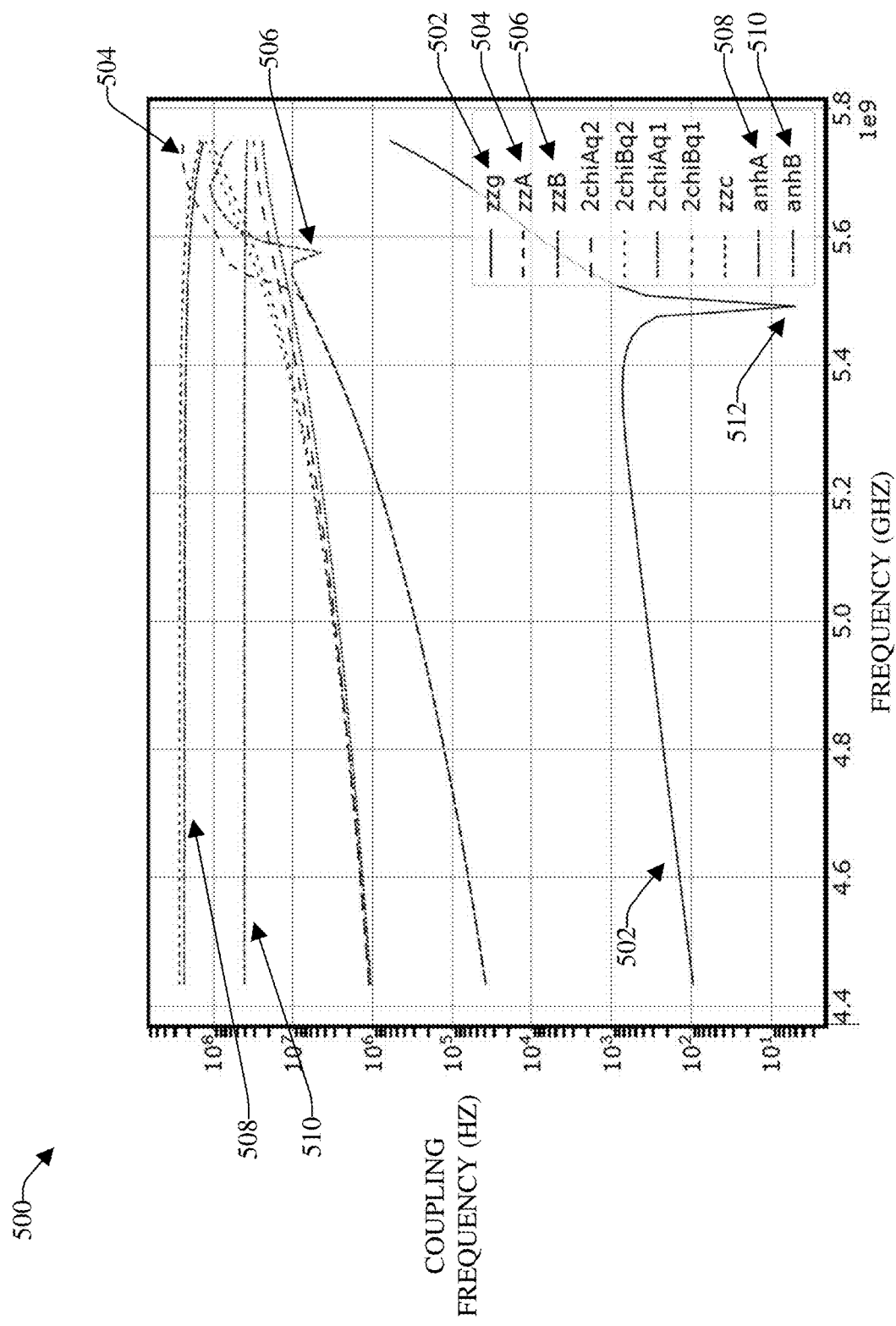
FIG. 5 presents a diagram of an example graph of simulation of a facemon coupler component when the frequencies associated with the facemon coupler component are above the frequencies associated with the qubits, in accordance with various aspects and embodiments of the disclosed subject matter.

Turning briefly to FIG. 5, FIG. 5 presents a diagram of an example graph 500 of simulation of a facemon coupler component when the frequencies associated with the facemon coupler component are above the frequencies associated with the qubits (e.g., first qubit and second qubit), in accordance with various aspects and embodiments of the disclosed subject matter. The graph 500 presents respective data points of respective parameters, including ZZ coupling of the ZZ gate, associated with the facemon coupler component, with rates of coupling of a system of two qubits (e.g., with detuning at 50 megahertz (MHz)) with the facemon coupler component, where the frequencies associated with the facemon coupler component can be above the frequencies associated with the two qubits in the frequency space. The graph 500 comprises data points 502 that can represent the ZZ interaction or coupling between the two qubits when the facemon coupler component is in the ground state, data points 504 that can represent the ZZ interaction or coupling between the two qubits when a first mode of oscillation (mode A) of the facemon coupler component is in the excited state, and data points 506 that can represent the ZZ interaction or coupling between the two qubits when a second mode of oscillation (mode B) of the facemon coupler component is in the excited state. The graph 500 also comprises data points 508 that can represent the anharmonicity associated with the facemon coupler component when the first mode (mode A) of the facemon coupler component is in the excited state, and data points 510 that can represent the anharmonicity associated with the facemon coupler component when the second mode (mode B) of the facemon coupler component is in the excited state.

As can be observed in the graph 500 with regard to the data points 502 relating to simulation results of the ZZ coupling of the ZZ gate, when the facemon coupler component is in the ground state, there can be a region of low ZZ coupling with a zero coupling, or an effective or approximate zero coupling, at approximately 5.5 gigahertz (GHz), as indicated at reference numeral 512 on the graph 500. As also can be observed in the graph 500 with regard to the data points 502, when one of the modes (e.g., the first mode of oscillation or the second mode of oscillation) of the facemon coupler component is in the excited state (e.g., relative to the ground state of the ground), the ZZ coupling of the ZZ gate can be enhanced (e.g., increased) and can attain several MHz for gates below 100 nanoseconds (ns), as indicated at reference numerals 504 and 506 of the graph 500.

Further, the data points 508 and 510, which respectively represent the anharmonicity simulation results with regard to the two modes, can indicate that the facemon coupler component desirably can be driven on resonance with the facemon coupler component being able to be returned to the ground state. The facemon coupler component can essentially act like a qubit, and because the facemon coupler component can be a non-linear coupler, the facemon coupler component desirably can be turned on and off by driving it on resonance.

Figure 6:
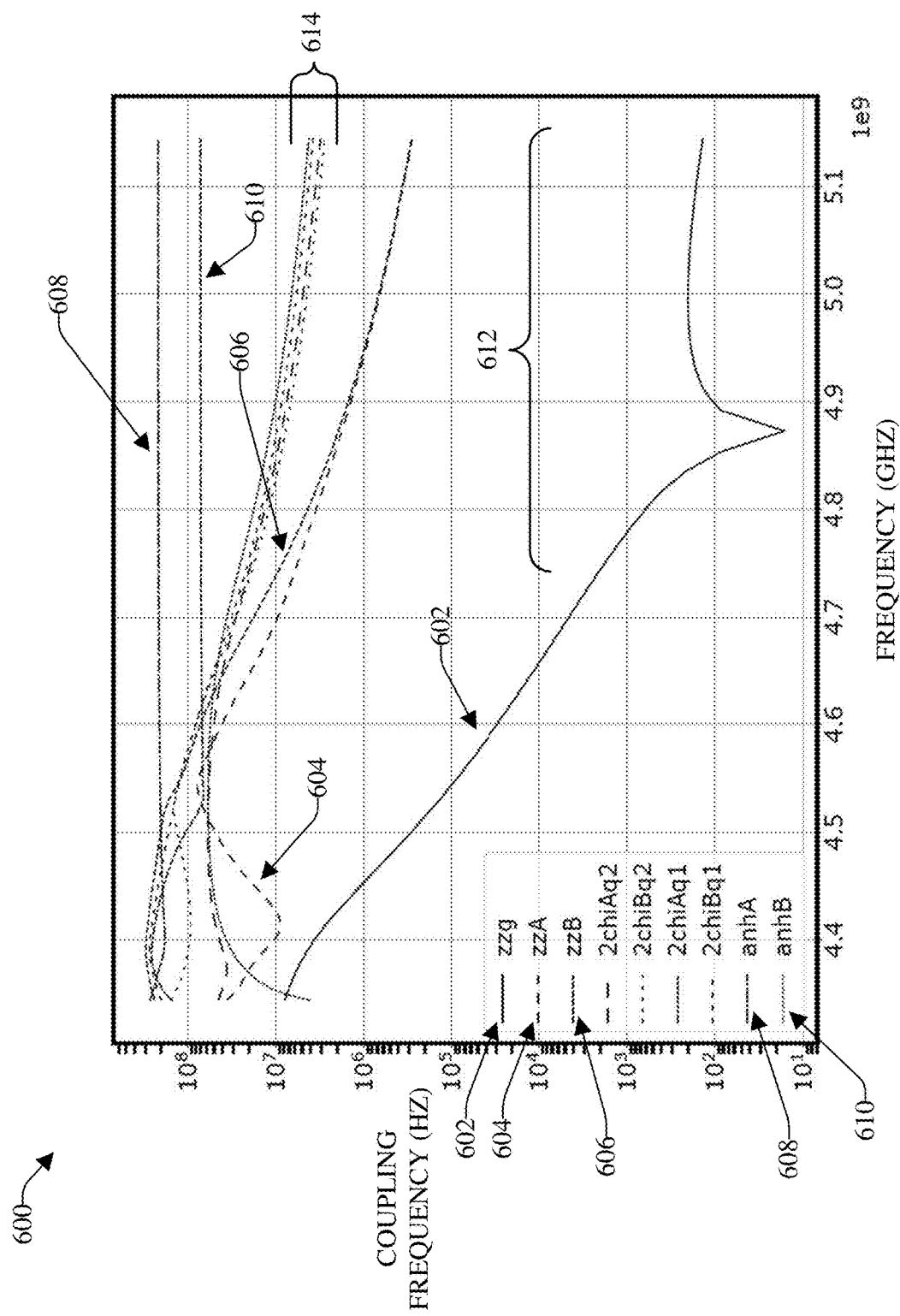
FIG. 6 depicts a diagram of an example graph of simulation of a facemon coupler component when the frequencies associated with the facemon coupler component are below the frequencies associated with the qubits, in accordance with various aspects and embodiments of the disclosed subject matter.

Referring briefly to FIG. 6, FIG. 6 depicts a diagram of an example graph 600 of simulation of a facemon coupler component when the frequencies associated with the facemon coupler component are below the frequencies associated with the qubits (e.g., first qubit and second qubit), in accordance with various aspects and embodiments of the disclosed subject matter. The graph 600 presents respective data points of respective parameters, including ZZ coupling of the ZZ gate, associated with the facemon coupler component, with rates of coupling of a system of two qubits (e.g., with detuning at 50 megahertz (MHz)) with the facemon coupler component, where the frequencies associated with the facemon coupler component can be below the frequencies associated with the two qubits in the frequency space. The graph 600 comprises data points 602 that can represent the ZZ interaction or coupling between the two qubits when the facemon coupler component is in the ground state, data points 604 that can represent the ZZ interaction or coupling between the two qubits when a first mode of oscillation (mode A) of the facemon coupler component is in the excited state, and data points 606 that can represent the ZZ interaction or coupling between the two qubits when a second mode of oscillation (mode B) of the facemon coupler component is in the excited state. The graph 600 also comprises data points 608 that can represent the anharmonicity associated with the facemon coupler component when the first mode (mode A) of the facemon coupler component is in the excited state, and data points 610 that can represent the anharmonicity associated with the facemon coupler component when the second mode (mode B) of the facemon coupler component is in the excited state.

As can be observed in the graph 600 with regard to the data points 602 relating to simulation results of the ZZ coupling of the ZZ gate, when the facemon coupler component is in the ground state, there can be a broad region of low ZZ coupling, as indicated at reference numeral 612 on the graph 600. As also can be observed in the graph 600 with regard to the data points 604 and data points 606, when one of the modes (e.g., the first mode (mode A) of oscillation or the second mode (mode B) of oscillation) of the facemon coupler component is in the excited state (e.g., relative to the ground state of the ground), the ZZ coupling of the ZZ gate can be enhanced (e.g., increased) and can attain approximately 10 MHz, while the facemon coupler component can maintain the idle ZZ coupling at about 1 kilohertz (kHz), as indicated at reference numeral 604 of the graph 600.

The graph 600 also can comprise 2chi-related data points 614, which, respectively, can comprise 2chiAq2 that can represent the shift in the second qubit's frequency when the first mode (mode A) of the facemon coupler component is excited, 2chiBq2 that can represent the shift in the second qubit's frequency when the second mode (mode B) of the facemon coupler component is excited, 2chiAq1 that can represent the shift in the first qubit's frequency when the first mode (mode A) of the facemon coupler component is excited, and 2chiBq1 that can represent the shift in the first qubit's frequency when the second mode (mode B) of the facemon coupler component is excited. As can be observed in the graph 600 with regard to the data points 602 (e.g., ZZ coupling when the facemon coupler component is in the ground state) in relation to (e.g., as compared to) the respective data points 614 relating to 2chi (e.g., 2chiAq2, 2chiBq2, 2chiAq1, and 2chiBq1), the ZZ/2chi ratio appears to be relatively improved with the frequencies associated with the coupler component below the frequencies associated with the qubits, as compared to when the frequencies associated with the coupler component are above the frequencies associated with the qubits. This may allow for more desirable (e.g., better) un-refocused gates associated with the qubits.

Figure 7:
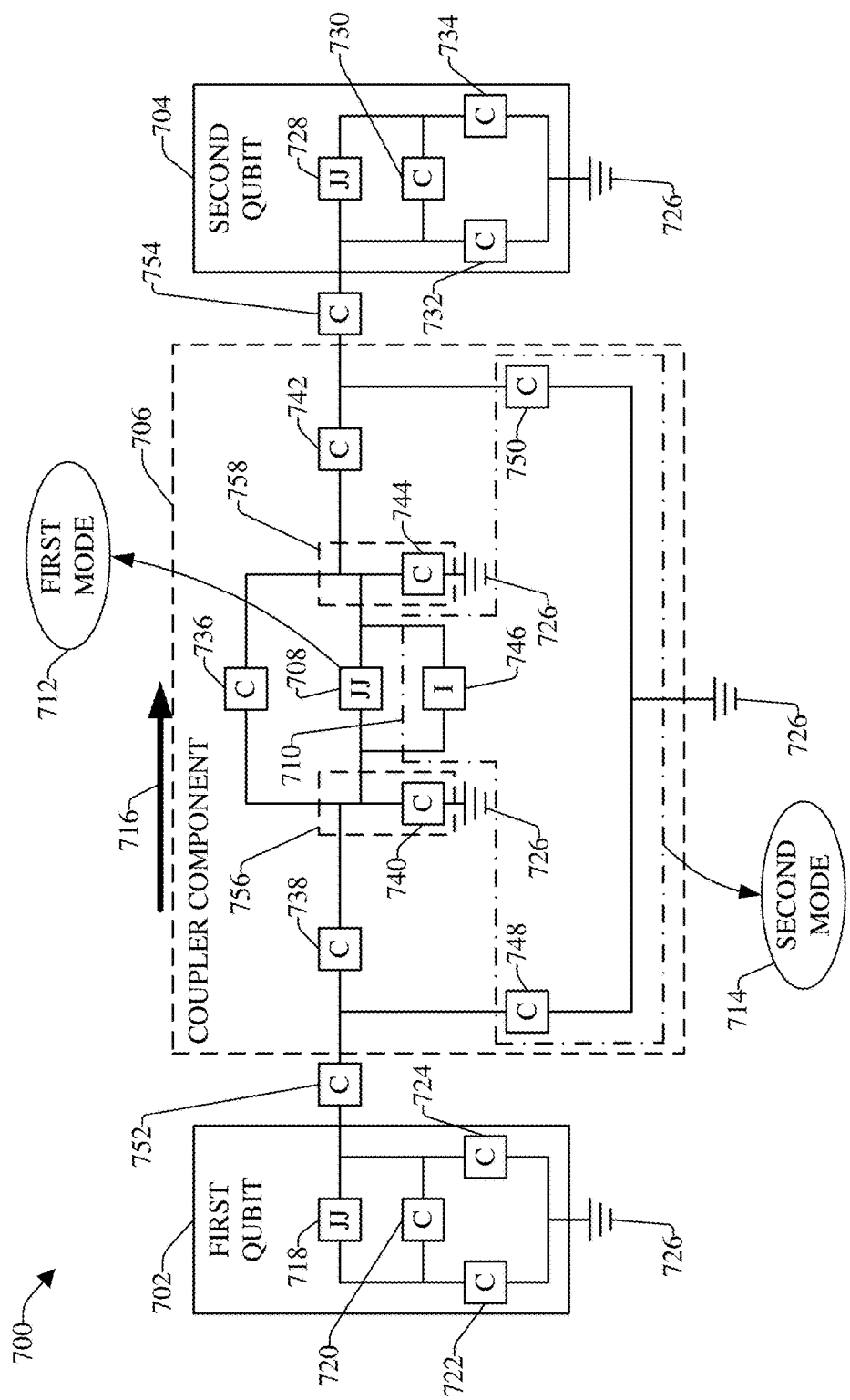
FIG. 7 depicts a schematic diagram of an example, non-limiting system that can comprise a coupler component that can employ a Josephson junction and resonator arrangement, and can manage interaction or coupling between qubits, in accordance with various aspects and embodiments of the disclosed subject matter.
Figure 8:
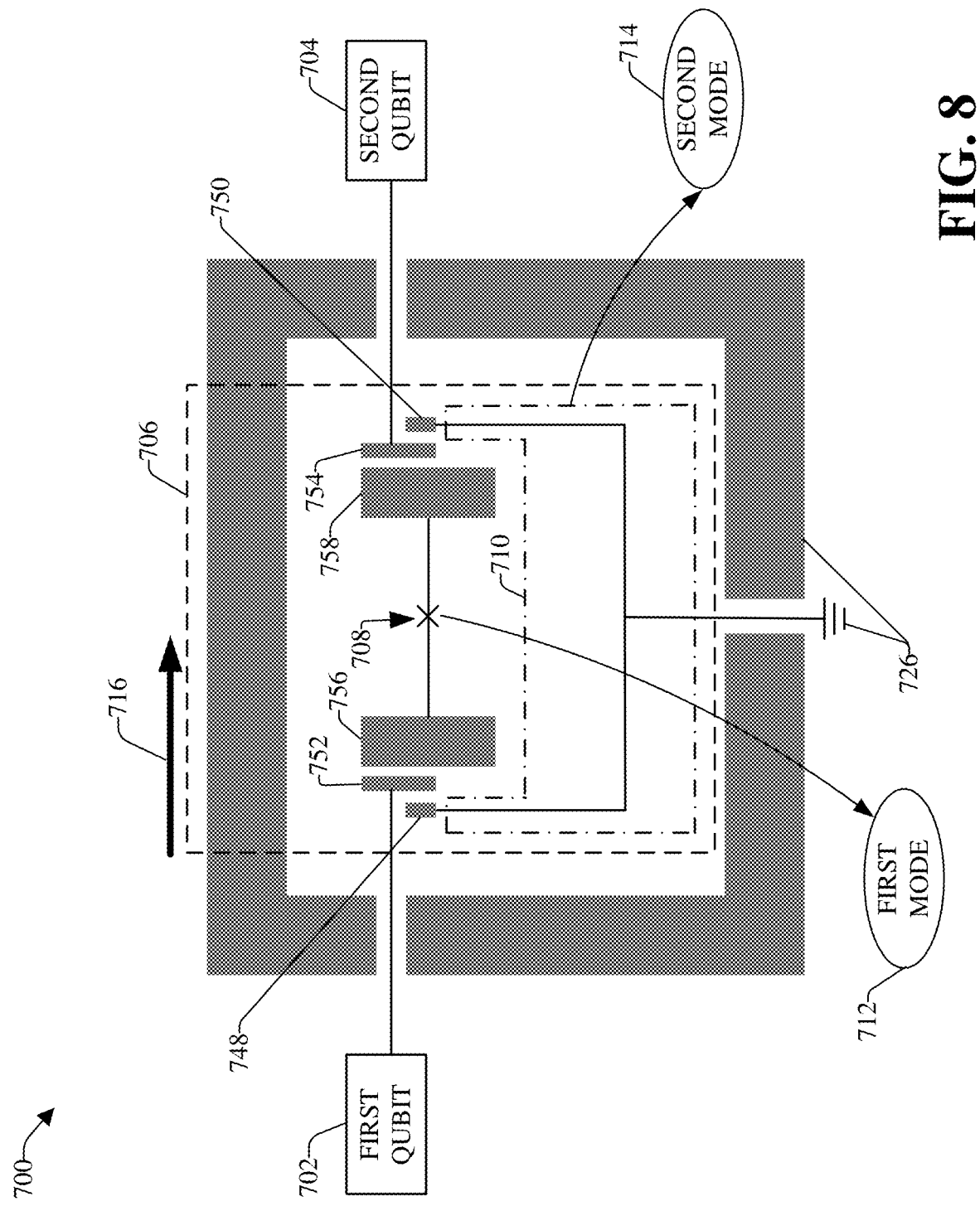
FIG. 8 depicts a diagram (e.g., a quantum circuit layout diagram) of an example, non-limiting system that can comprise a coupler component that can employ a Josephson junction and resonator arrangement, and can manage interaction or coupling between qubits, in accordance with various aspects and embodiments of the disclosed subject matter.

FIGS. 7 and 8 depict diagrams of an example, non-limiting system 700 that can comprise a coupler component (e.g., an L4ZZAP coupler component) that can employ a JJ and resonator arrangement, and can manage interaction or coupling between qubits, in accordance with various aspects and embodiments of the disclosed subject matter. FIG. 7 illustrates a schematic diagram of the non-limiting example system 700, and FIG. 8 illustrates a diagram (e.g., a quantum circuit layout diagram) of the non-limiting example system 700. The system can comprise various components and circuitry (e.g., quantum components and circuitry) that can be arranged to perform one or more desired functions, such as described herein. The system 700 can comprise a first qubit 702 and a second qubit 704. In some embodiments, the first qubit 702 and second qubit 704 can be transmon qubits. In other embodiments, the first qubit 702 and second qubit 704 can a different type of qubit.

In accordance with various embodiments, the system 700 can comprise a coupler component 706 that can enable and manage interactions and coupling between the first qubit 702 and second qubit 704. The coupler component 706 can be situated between (e.g., logically or physically between) the first qubit 702 and second qubit 704 in the quantum circuit. One end (e.g., a first port or lead) of the coupler component 706 can be associated with (e.g., connected to) the first qubit 702, and another end (e.g., a second port or lead) of the coupler component 706 can be associated with (e.g., connected to) the second qubit 704.

In some embodiments, the coupler component 706 can be an L4ZZAP coupler component that can comprise a JJ 708 and an L/4 resonator 710 that can be arranged parallel with each other in the quantum circuit, wherein the JJ 708 can be associated with a first mode of oscillation 712 and the L/4 resonator 710 can be associated with a second mode of oscillation 714. The first mode 712 can be an even mode and the second mode 714 can be an odd mode (or vice versa) that can provide opposite signs of coupling between the first qubit 702 and second qubit 704.

The coupler component 706 can control the activation status of the ZZ gate associated with the coupler component 706 and qubits 702 and 704, and thereby the coupling between the first qubit 702 and second qubit 704, based on the excitation status of the first mode 712 and the relationship between the first mode 712 and the second mode 714. The excitation status can be based on whether a pulse (e.g., RF or pi-type pulse) is applied to the coupler component 706 via a charge line 716, which can be located in or in proximity to (e.g., within a defined distance of) the coupler component 706 (e.g., located in or near the qubit pocket, and in proximity to the JJ 708 or another component) in the quantum circuit. When no pulse is applied to the coupler component 706, the first mode 712 can be in the ground state, and, as a result, the ZZ gate can be in an inactive state and there can be no coupling, or at least close to no coupling, between the first qubit 702 and the second qubit 704. This can be because, when no pulse is applied to the coupler component 706, and the first mode 712 and second mode 714 both can be in the ground state, due in part to the symmetry between the first mode 712 and second mode 714, and the opposite signs of coupling associated with the first mode 712 and second mode 714, the second mode 714 associated with the L/4 resonator 710 can interfere with the first mode 712 associated with the JJ 708 and can cancel out, or at least substantially (and suitably or sufficiently) cancel out or suppress, coupling between the first qubit 702 and the second qubit 704. When the charge line 716 applies a pulse (e.g., RF or pi pulse at a first frequency associated with the first mode 712) to the coupler component 706 based on a desired voltage or current supplied to the charge line 716, the first mode 712 can be in the excited state, which can create an imbalance between the first mode 712 and the second mode 714, and, as a result, the coupler component 706 can control the ZZ gate to transition the ZZ gate from the inactive state to the active state and, as a result, there can thereby be a coupling between the first qubit 702 and the second qubit 704. Thus, the coupler component 706 can desirably control interactions and coupling between the first qubit 702 and second qubit 704 without the coupler component 706 having to be in an always on state, which can desirably reduce the amount of power utilized by the coupler component 706 to manage interactions and coupling between the first qubit 702 and second qubit 704 (e.g., as compared to existing couplers, such as always on couplers).

With further regard to the first qubit 702, second qubit 704, coupler component 706, and other components of the system 700, the first qubit 702 can comprise JJ 718 and capacitor 720, which can be connected in parallel to each other. The first qubit 702 also can comprise capacitor 722 and capacitor 724, which each can be connected to JJ 718 and capacitor 720 at one end, and can be connected to ground 726 at the other end. Similarly, the second qubit 704 can comprise JJ 728 and capacitor 730, which can be connected in parallel to each other. The second qubit 704 also can comprise capacitor 732 and capacitor 734, which each can be connected to JJ 728 and capacitor 730 at one end, and can be connected to ground 726 at the other end.

With further regard to the JJ 708, a capacitor 736 can be connected in parallel to the JJ 708. At one end (e.g., lead or connector) of JJ 708 and the capacitor 736, capacitor 738 and capacitor 740 can be connected to the JJ 708 and capacitor 736, wherein capacitor 740 can be connected to the ground 726 at its other end. At the other end of JJ 708 and the capacitor 736, capacitor 742 and capacitor 744 can be connected to the JJ 708 and capacitor 736, wherein capacitor 744 can be connected to the ground 726 at its other end.

The L/4 resonator 710 can comprise inductor (I) 746, which can be connected in parallel to the JJ 708 of the coupler component 706. One end of the inductor 746 also can be connected to capacitors 738 and 740, and the other end of the inductor 746 can be connected to capacitors 742 and 744, such as depicted in FIG. 7. The L/4 resonator 710 also can comprise capacitor 748 and capacitor 750 that, at one end (e.g., lead or connector), can be connected to capacitor 738 and capacitor 742, respectively, and, at their other end, can be connected to the ground 726, such as depicted in FIG. 7.

In some embodiments, the system 700 can comprise (e.g., optionally can comprise) a capacitor 752 (e.g., capacitive coupler) that can be between and connected to the first qubit 702 and the coupler component 706 (e.g., capacitor 738 of the coupler component 706) to facilitate coupling the first qubit 702 to the coupler component 706. The system 700 also can comprise (e.g., optionally can comprise) a capacitor 754 that can be between and connected to the second qubit 704 and the coupler component 706 (e.g., capacitor 742 of the coupler component 706) to facilitate coupling the second qubit 704 to the coupler component 706.

As depicted in the example quantum circuit layout of FIG. 8, the quantum circuit layout can comprise various pads, including pads that can correspond to capacitors 748 and 750, pads that can correspond to capacitors 752 and 754, and pads 756 and 758, wherein capacitor 740 can be associated with pad 756, and capacitor 744 can be associated with pad 758.

Figure 9:
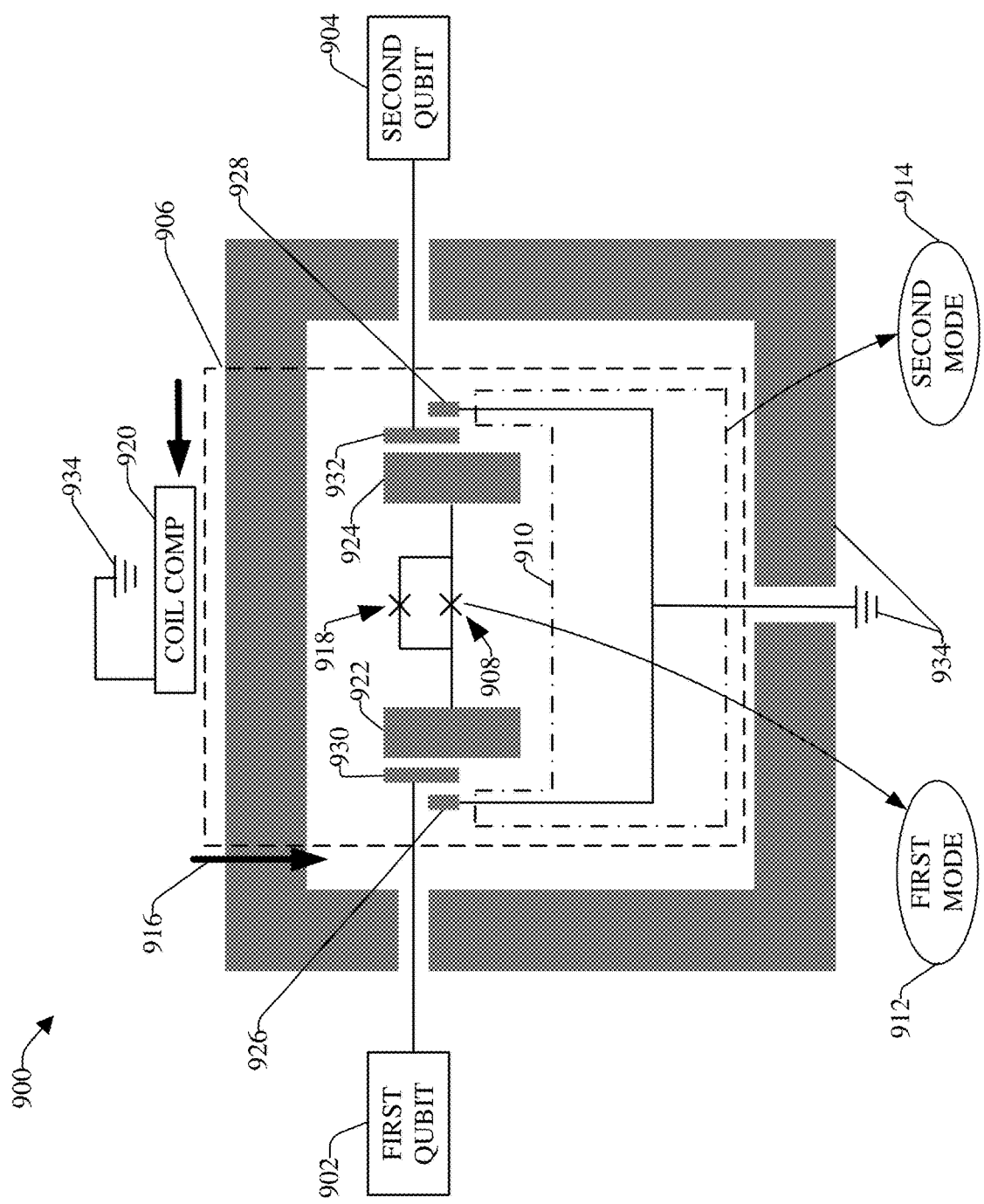
FIG. 9 illustrates a block diagram of an example, non-limiting system that can comprise a tuneable coupler component that can employ a Josephson junction and resonator arrangement, and can manage interaction or coupling between qubits, in accordance with various aspects and embodiments of the disclosed subject matter.

FIG. 9 illustrates a block diagram of an example, non-limiting system 900 that can comprise a tuneable coupler component (e.g., an L4ZZAP coupler component) that can employ a JJ and resonator arrangement, and can manage interaction or coupling between qubits, in accordance with various aspects and embodiments of the disclosed subject matter. The system 900 can comprise a first qubit 902 and second qubit 904. In some embodiments, the first qubit 902 and second qubit 904 can be transmon qubits, or, in other embodiments, the first qubit 902 and second qubit 904 can a different type of qubit.

In accordance with various embodiments, the system 900 can comprise a coupler component 906 that can enable and manage interactions and coupling between the first qubit 902 and second qubit 904. The coupler component 906 can be situated between (e.g., logically or physically between), and connected to, the first qubit 902 and second qubit 904 in the quantum circuit. In some embodiments, the coupler component 906 can be an L4ZZAP coupler component that can comprise a JJ 908 and an L/4 resonator 910 that can be arranged parallel with each other in the quantum circuit, wherein the JJ 908 can be associated with a first mode of oscillation 912 and the L/4 resonator 910 can be associated with a second mode of oscillation 914. The first mode 912 can be an even mode and the second mode 914 can be an odd mode (or vice versa) that can provide opposite signs of coupling between the first qubit 902 and second qubit 904, such as described herein.

The coupler component 906 can desirably control the activation status of the ZZ gate associated with the coupler component 906 and qubits 902 and 904, and thereby the coupling between the first qubit 902 and second qubit 904, based on the excitation status of the first mode 912 in relation to the second mode 914, such as described herein. The excitation status can be based on whether a pulse (e.g., RF or pi-type pulse) is applied to the coupler component 906 via a charge line 916, which can be located in or in proximity to (e.g., within a defined distance of) the coupler component 906 (e.g., located in or near the qubit pocket, and in proximity to the JJ 908 or another component) in the quantum circuit. The coupler component 906 can operate in a same or similar manner as, for example, the coupler component 706 of FIGS. 7 and 8, and described herein, except that the coupler component 906 can be tuneable, such as more fully described herein.

In some embodiments, to facilitate enabling the coupler component 906 to be desirably tuned, the quantum circuit of the system 900 also can comprise a second JJ 918 and a coil component 920. The second JJ 918 that can be connected in parallel to the JJ 908 (e.g., a split Josephson junction). The coil component 920 can be formed or located in proximity to (e.g., within a defined distance of) the JJ 908 and the second JJ 918. The coil component 920 can comprise a desired number of windings (e.g., one winding, or multiple windings), or can comprise a wire component (e.g., a superconductive wire) that can be a coil with a single winding. When it is desired to tune the JJ 908, a desired current can be supplied to the coil component 920, and the current in the coil component 920 can generate (e.g., create) a magnetic flux. The amount of magnetic flux generated can be based on the amount of current in the coil component 920, and the amount of flux applied to the JJ 908 and second JJ 918 can be based on the amount of flux generated and the proximity of the coil component 920 to the JJ 908 and the second JJ 918. Due in part to the second JJ 918 being connected in parallel to the JJ 908, and the coil component 920 being in proximity to the JJ 908 and second JJ 918, one or more parameters (e.g., frequency or another parameter) associated with the JJ 908 can be desirably tuned (e.g., modified, adjusted, or changed lower or higher) based on the magnetic flux generated by the coil component 920.

In some embodiments, the coil component 920 and current supplied thereto can desirably tune (e.g., adjust) one or more parameters, such as a frequency, associated with the coupler component 906 (e.g., the frequency of the JJ 908 of the coupler component 906) to, for example, place the second mode 914 sufficiently opposite to the first mode 912, if from the fabrication of the quantum device, the first mode 912 associated with the JJ 908 is not sufficiently opposite to the second mode 914 associated with the L/4 resonator 910. In certain embodiments, the coil component 920 and current supplied thereto can desirably tune one or more parameters, such as a frequency, associated with the coupler component 906 to facilitate placing the first mode 912 out of balance with the second mode 914. Adjusting, for example, the frequency associated with the first mode 412 out of balance with the second mode 414 can result in the ZZ gate being transitioned from the inactive state to activated state, and a desired interaction or coupling between the first qubit 902 and second qubit 904 can occur.

The quantum circuit of the system 900 also can comprise a number of pads, including pad 922, pad 924, pad 926, pad 928, pad 930, and pad 932. The pads 922 through 932 can be formed of a desired conductive (e.g., superconductive) material. In the quantum circuit, respective ends (e.g., respective leads or ports) of the JJ 908 (and second JJ 918) can be associated with (e.g., connected to) the pad 922 and pad 924. Also, in the quantum circuit, the resonator 910 can comprise an inductor and capacitors, such as described herein. A capacitor of the resonator 910 can be, or can be associated with, the pad 926, and another capacitor of the resonator 910 can be, or can be associated with, the pad 928. The pads 926 and 928, and associated capacitors of the resonator 910, can be connected to the ground 934. In some embodiments, the quantum circuit of the system 900 can comprise (e.g., optionally can comprise) capacitors that can act as capacitive couplers, wherein pad 930 can be, or can be associated with, a capacitor that can act as a capacitive coupler to couple the first qubit 902 to the coupler component 906, and wherein pad 932 can be, or can be associated with, a capacitor that can act as a capacitive coupler to couple the second qubit 904 to the coupler component 906.

The coupler components, such as described herein, can have a number of advantages over existing coupler technology. For instance, the disclosed coupler components desirably (e.g., suitably, enhancedly, or optimally) can have enhanced performance and efficiency, and can provide enhanced management of interactions and coupling between qubits, over existing couplers. The disclosed coupler components desirably can activate quicker and can have faster gates, as compared to existing couplers. The disclosed coupler components also can utilize less power than existing couplers (e.g., existing always on couplers). The disclosed coupler components further can desirably manage interactions and coupling between qubits without having to be detuned.

It is to be appreciated and understood that, while the quantum devices described herein only depict two qubits and one coupler component, which can be formed on a single die, in some embodiments, the quantum devices can comprise a desired number of qubits (e.g., more than two qubits) and a desired number of coupler components (e.g., one or more coupler components) respectively associated with the qubits that can be formed on the chip stack on a single die.

Figure 10:
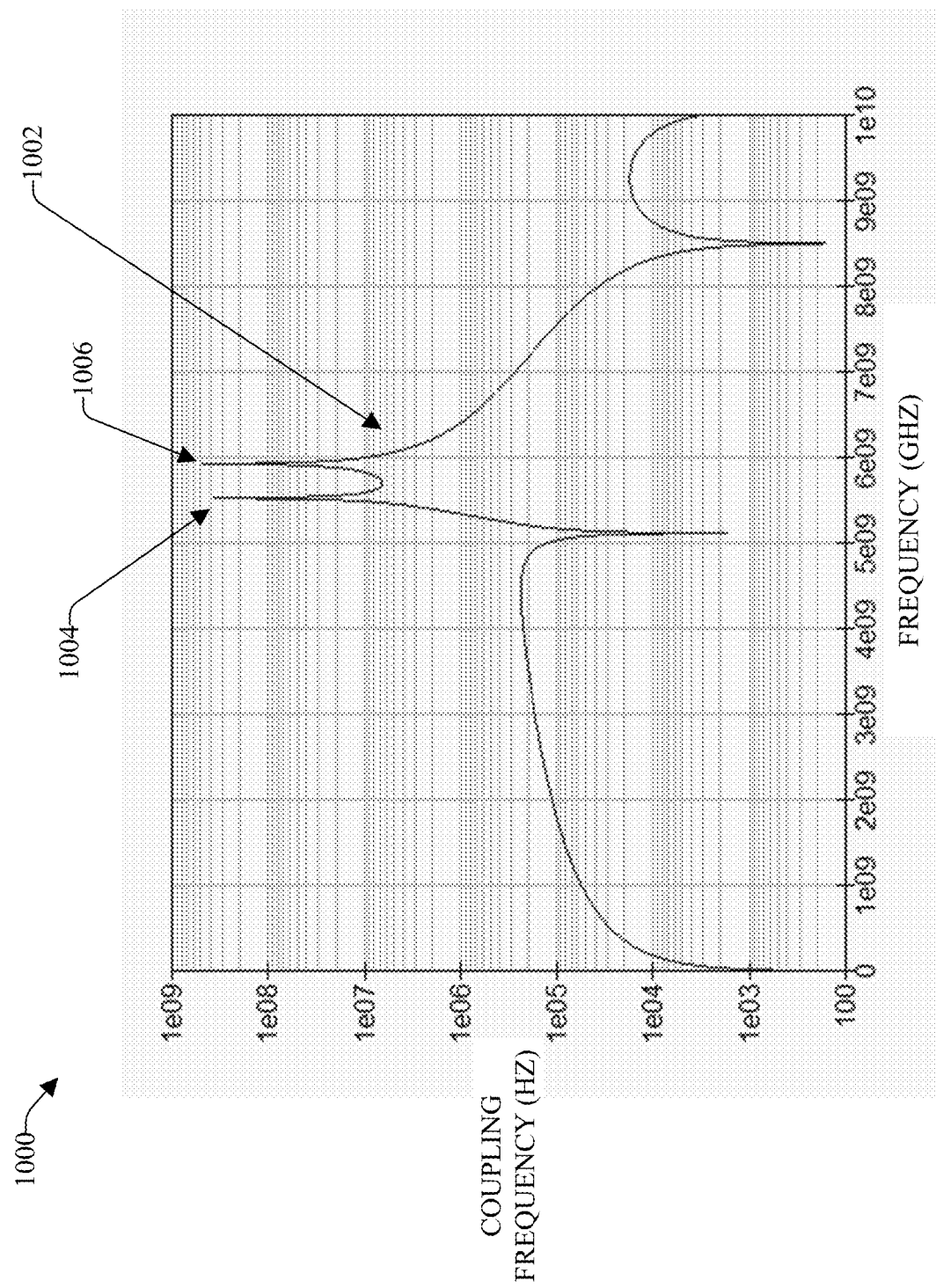
FIG. 10 presents a diagram of an example graph of a simulation of ground state coupling of a coupler component that can employ a Josephson junction and resonator arrangement, in accordance with various aspects and embodiments of the disclosed subject matter.

Turning briefly to FIG. 10, FIG. 10 presents a diagram of an example graph 1000 of a simulation of ground state coupling of a coupler component (e.g., an L4ZZAP coupler component) that can employ a JJ and resonator (e.g., L/4 resonator) arrangement, in accordance with various aspects and embodiments of the disclosed subject matter. The graph 1000 presents respective data points of coupling (along the y-axis) between qubits in relation to (e.g., as a function of) frequency (along the x-axis). As can be observed in the graph 1000 with regard to the data points 1002 relating to simulation results of the ground state coupling of the coupler component positioned between, and connected to, a pair of qubits, when the coupler component is in the ground state, the coupling between the qubits (e.g., approximately 4 GHz to 5 GHz) can be desirably (e.g., suitably, enhancedly, or optimally) low and even can have a zero coupling, or at least close to zero coupling, in the qubit frequency band of the qubits. This can be because the coupling qubit (e.g., the qubit formed using the JJ in the JJ and resonator arrangement) and the L/4 resonator can have opposite sign couplings (e.g., can be associated with opposing modes), and the first mode associated with the coupling qubit and the second mode associated with the L/4 resonator can interfere with each other for broadband cancellation of coupling between the qubits when the coupler component is in the ground state. As also can be observed in the graph 1000 with regard to data points 1002, at approximately 5.5 GHz and 6 GHz, there can be peaks (e.g., peak 1004 and peak 1006) in the data points 1002 that can be respectively associated with the first mode of oscillation and second mode of oscillation of the coupler component.

Figure 11:
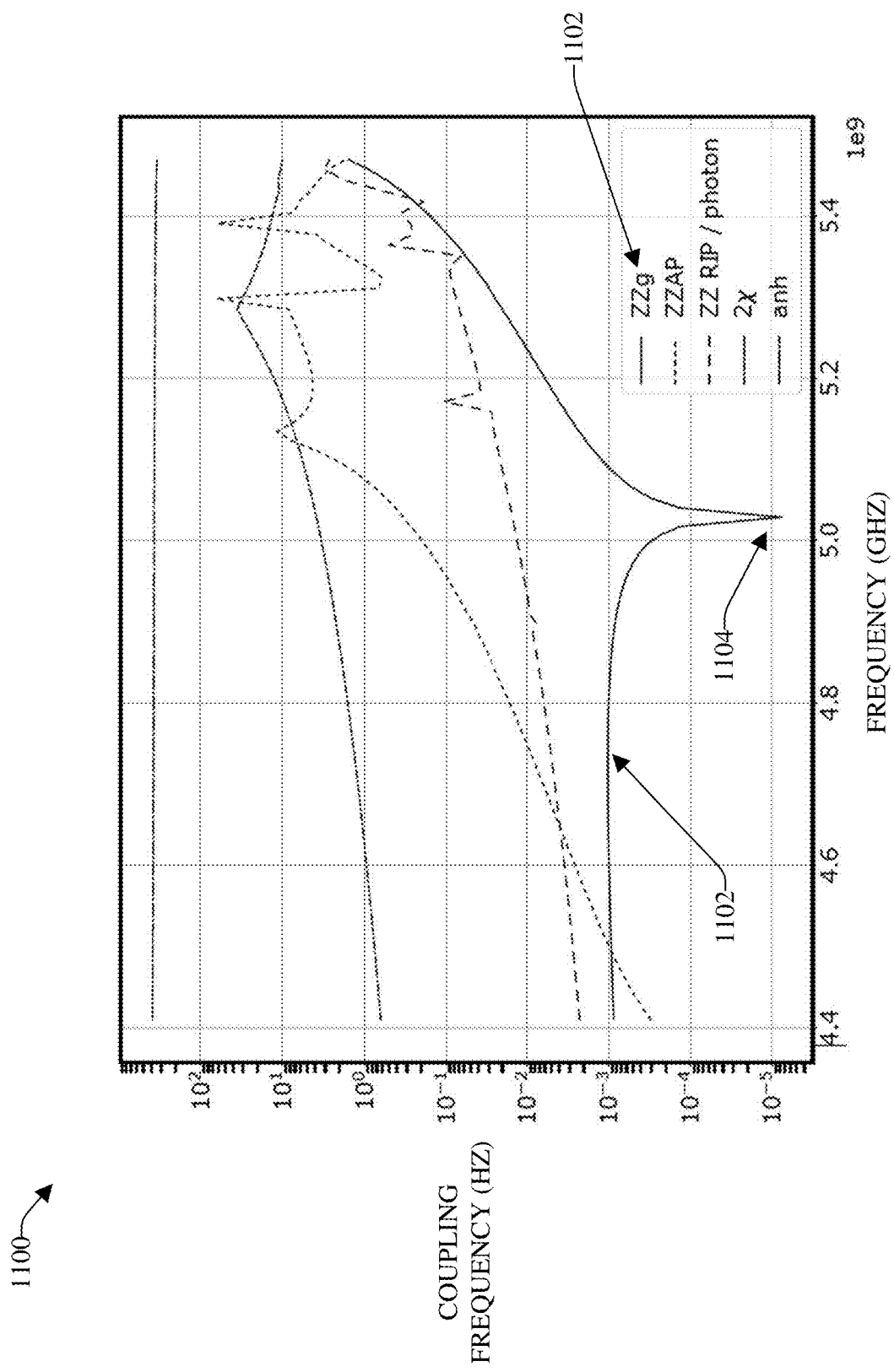
FIG. 11 depicts a diagram of an example graph of simulation of gate speed of a coupler component that can employ a Josephson junction and resonator arrangement, in accordance with various aspects and embodiments of the disclosed subject matter.

Referring briefly to FIG. 11, FIG. 11 depicts a diagram of an example graph 1100 of simulation of gate speed (e.g., ZZ gate speed) of a coupler component (e.g., an L4ZZAP coupler component) that can employ a JJ and resonator (e.g., L/4 resonator) arrangement, in accordance with various aspects and embodiments of the disclosed subject matter.

The graph 1100 presents respective data points of respective parameters, including the gate speed in frequency of the gate (e.g., ZZ gate) associated with the coupler component (along the y-axis) in relation to (e.g., as a function of) the frequency the pulse applied to the coupler component (along the x-axis).

As can be observed in the graph 1100 with regard to the data points 1102 relating to simulation results relating to the gate associated with the coupler component, by placing the L/4 mode relatively close to the frequency of the coupling qubit (e.g., the qubit formed using the JJ in the JJ and resonator arrangement), the zero coupling, or at least close to zero coupling, between qubits from cancellation between the first mode and second mode when the coupler component is in the ground state can be confirmed by Cauer code simulations of the combined system. The data points 1102 can represent the ZZ gate between the two qubits when the L4ZZAP coupler component is in the ground state. In the data points 1102 in the graph 1100, a zero in the ZZ gate between the two qubits is shown at approximately 5.0 GHz, as indicated at reference numeral 1104. The ZZ speed when the coupler component is activated, by exciting one of the two modes, can reach approximately 10 MHz, while the ZZ, when the coupler component is in the ground state, can remain below 10 kHz.

Figure 12:
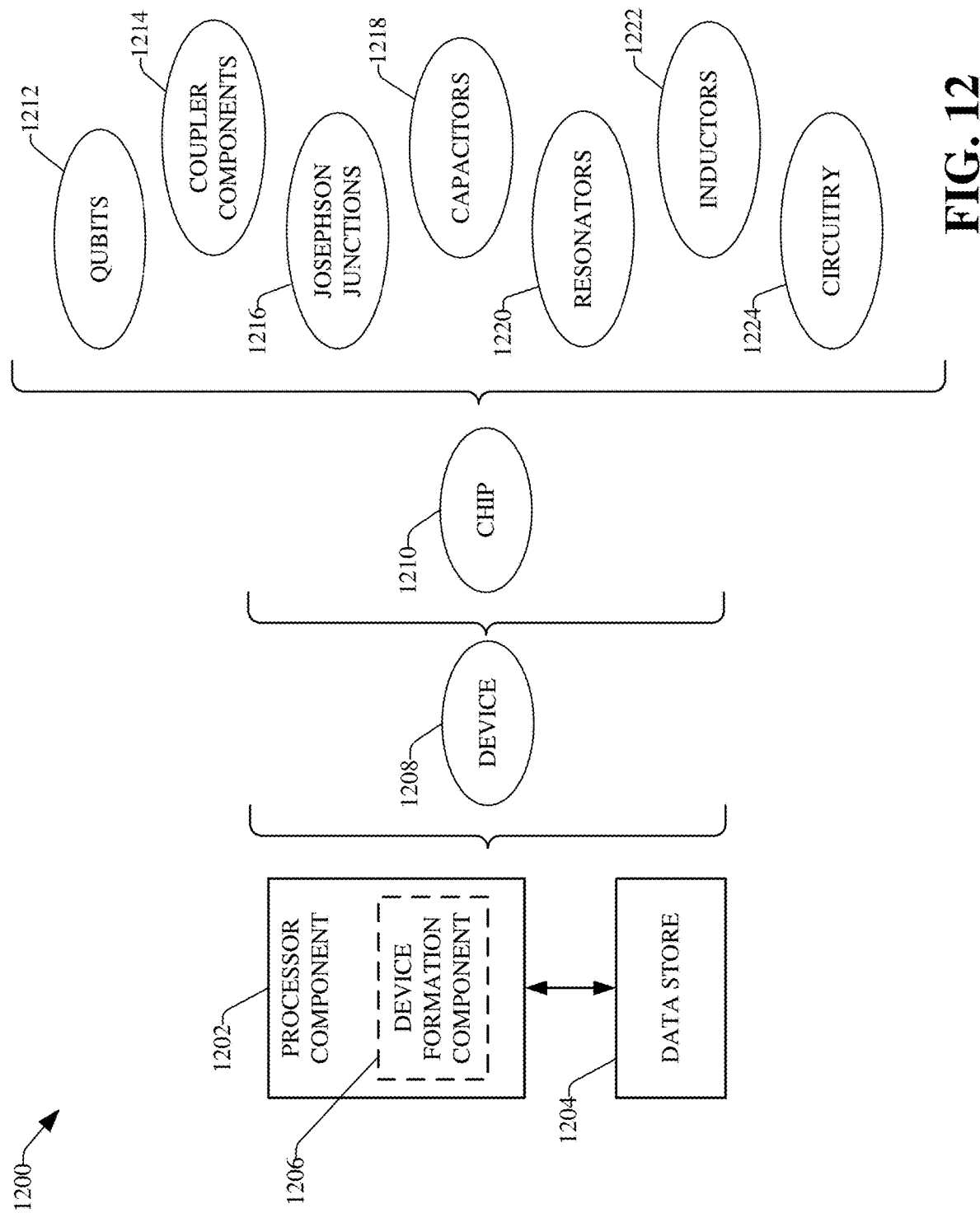
FIG. 12 depicts a block diagram of an example system that can be utilized to create, form, or design a device comprising qubits, coupler components, and/or other quantum components, elements, or circuitry, in accordance with various aspects and embodiments of the disclosed subject matter.

FIG. 12 depicts a block diagram of an example system 1200 that can be utilized to create, form, or design a device comprising qubits, coupler components, and/or other quantum components, elements, or circuitry, in accordance with various aspects and embodiments of the disclosed subject matter. The system 1200 can comprise a processor component 1202 and a data store 1204. In accordance with various embodiments, the processor component 1202 can comprise or be associated with (e.g., communicatively connected to) a device formation component 1206 that can be utilized to create, form, or design various components of or associated with a device 1208, including qubits, coupler components, and associated quantum components, elements, or circuitry, such as more fully described herein. For instance, the device formation component 1206 can be utilized to create, form, or design the various components of a device 1208 that can be formed or situated on a chip 1210 (e.g., a quantum computer or qubit device IC chip), or more than one chip, if desired. The various components can comprise, for example, qubits 1212, coupler components 1214, JJs 1216, capacitors 1218, resonators 1220, inductors 1222, and/or associated circuitry 1224.

As part of and to facilitate creating, forming, or designing the various components of or associated with a device 1208, the device formation component 1206 can form or process substrates. Also, as part of and to facilitate creating, forming, or designing the various components and/or circuitry of or associated with the device 1208, the device formation component 1206 also can form, deposit, remove (e.g., selectively remove or etch), pattern, or process materials, including silicon or silicon-based materials (e.g., dielectric materials), superconducting materials, or other materials of the device 1208. For example, the device formation component 1206 can employ and/or can control various processes, including fabrication processes, microfabrication processes, nanofabrication processes, material deposition processes (e.g., a low pressure chemical vapor deposition (LPCVD) process), masking or photoresist processes, photolithography processes, chemical etching processes (e.g., reactive-ion etching (RIE) process, a potassium hydroxide (KOH) etching process), other etching or removal processes, epitaxial processes, material straining processes, patterning processes, planarization processes (e.g., chemical-mechanical planarization (CMP) process), component formation processes, and/or other desired processes to desirably form, deposit, remove (e.g., selectively remove or etch), pattern, or process materials to facilitate creating or forming the respective components or circuitry of the device 1208.

The processor component 1202 can work in conjunction with the other components (e.g., the data store 1204, the device formation component 1206, or another component) to facilitate performing the various functions of the system 1200. The processor component 1202 can employ one or more processors, microprocessors, or controllers that can process data, such as information relating to designing, creating, or forming quantum computers, qubits 1212, coupler components 1214, JJs 1216, capacitors 1218, resonators 1220 (e.g., microwave resonators), inductors 1222, waveguides, electrodes, filters, and/or other components or devices, and information relating to circuit design criteria, circuit design algorithms, traffic flows, policies, protocols, interfaces, tools, and/or other information, to facilitate operation of the system 1200, as more fully disclosed herein, and control data flow between the system 1200 and other components (e.g., computer components, computer, laptop computer, other computing or communication device, or network device) associated with (e.g., connected to) the system 1200.

The data store 1204 can store data structures (e.g., user data, metadata), code structure(s) (e.g., modules, objects, hashes, classes, procedures) or instructions, information relating to designing, creating, or forming quantum computers, qubits 1212, coupler components 1214, JJs 1216, capacitors 1218, resonators 1220 (e.g., microwave resonators), inductors 1222, waveguides, electrodes, filters, and/or other components or devices, and information relating to circuit design criteria, circuit design algorithms, traffic flows, policies, protocols, interfaces, tools, and/or other information, to facilitate controlling operations associated with the system 1200. In an aspect, the processor component 1202 can be functionally coupled (e.g., through a memory bus) to the data store 1204 in order to store and retrieve information desired to operate and/or confer functionality, at least in part, to the data store 1204, the device formation component 1206, or other component, and/or substantially any other operational aspects of the system 1200.

It should be appreciated that the data store 504 described herein can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 13:
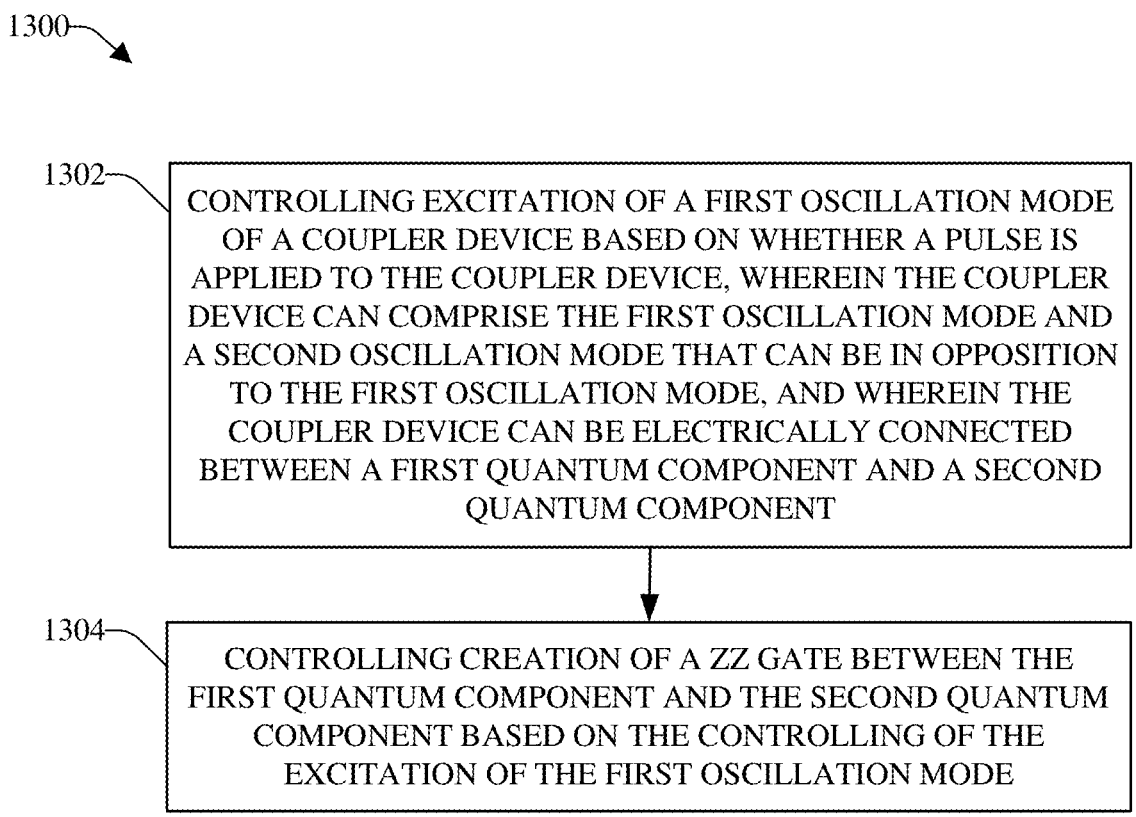
FIG. 13 illustrates a flow diagram of an example, non-limiting method that can control a coupling between a first quantum component and a second quantum component, in accordance with various aspects and embodiments of the disclosed subject matter.

FIG. 13 illustrates a flow diagram of an example, non-limiting method 1300 that can control a coupling between a first quantum component and a quantum component, in accordance with various aspects and embodiments of the disclosed subject matter. The method 1300 can be performed by, for example, a coupler device or a system (e.g., computer system) comprising or operatively coupled to a device formation component, a processor component, and a memory. Repetitive description of like elements employed in other embodiments described herein is or may be omitted for sake of brevity.

At 1302, excitation of a first oscillation mode of a coupler device can be controlled based on whether a pulse is applied to the coupler device, wherein the coupler device can comprise the first oscillation mode and a second oscillation mode that can be in opposition to the first oscillation mode, and wherein the coupler device can be electrically connected between a first quantum component and a second quantum component. The device formation component can connect the coupler device (e.g., coupler component) to the first quantum component on one end of the coupler device and the second quantum component on the other end of the coupler device. In some embodiments, the coupler device can be a ZZAP coupler device, such as a facemon coupler device, such as described herein. In other embodiments, the coupler device can be an L4ZZAP coupler device, such as described herein. Via the coupler device, there can be a ZZ gate that can be controlled (e.g., created or suppressed) between the first quantum component and second quantum component. In accordance with various embodiments, the first quantum component and second quantum component can be qubits or other types of electronic elements of an electronic circuit (e.g., quantum circuit) for which controlling of coupling between the first quantum component and second quantum component is desired (e.g., wanted).

At 1304, creation of a ZZ gate between the first quantum component and the second quantum component can be controlled based on the controlling of the excitation of the first oscillation mode. For instance, the activation status of the ZZ gate, and thus, the creation of the ZZ gate, between the first quantum component and the second quantum component can be controlled based on the controlling of the excitation of the first oscillation mode and a relationship between the first oscillation mode and the second oscillation mode (e.g., the second oscillation mode being in opposition to the first oscillation mode). With regard to the relationship between the two modes, in some embodiments, the first oscillation mode and the second oscillation mode can have opposite signs of coupling with respect to the first quantum component and second quantum component. When no pulse is supplied to the coupler device, the coupler device can be in the ground state (e.g., the first oscillation mode and second oscillation mode can be in the ground state), and, as a result, the second oscillation mode can interfere with the first oscillation mode, and the ZZ gate can be inactive, which can cancel, inhibit, suppress, or discontinue coupling between the first qubit and second qubit. When the pulse (e.g., RF or pi pulse) is supplied to the coupler device (e.g., via a charge line), the first oscillation mode can be in the excited state, and an imbalance can be created between the first oscillation mode and the second oscillation mode. As a result, the ZZ gate can be activated (e.g., open or created), and there can be coupling between the first quantum component (e.g., first qubit or other type of quantum component) and second quantum component (e.g., second qubit or other type of quantum component).

Figure 14:
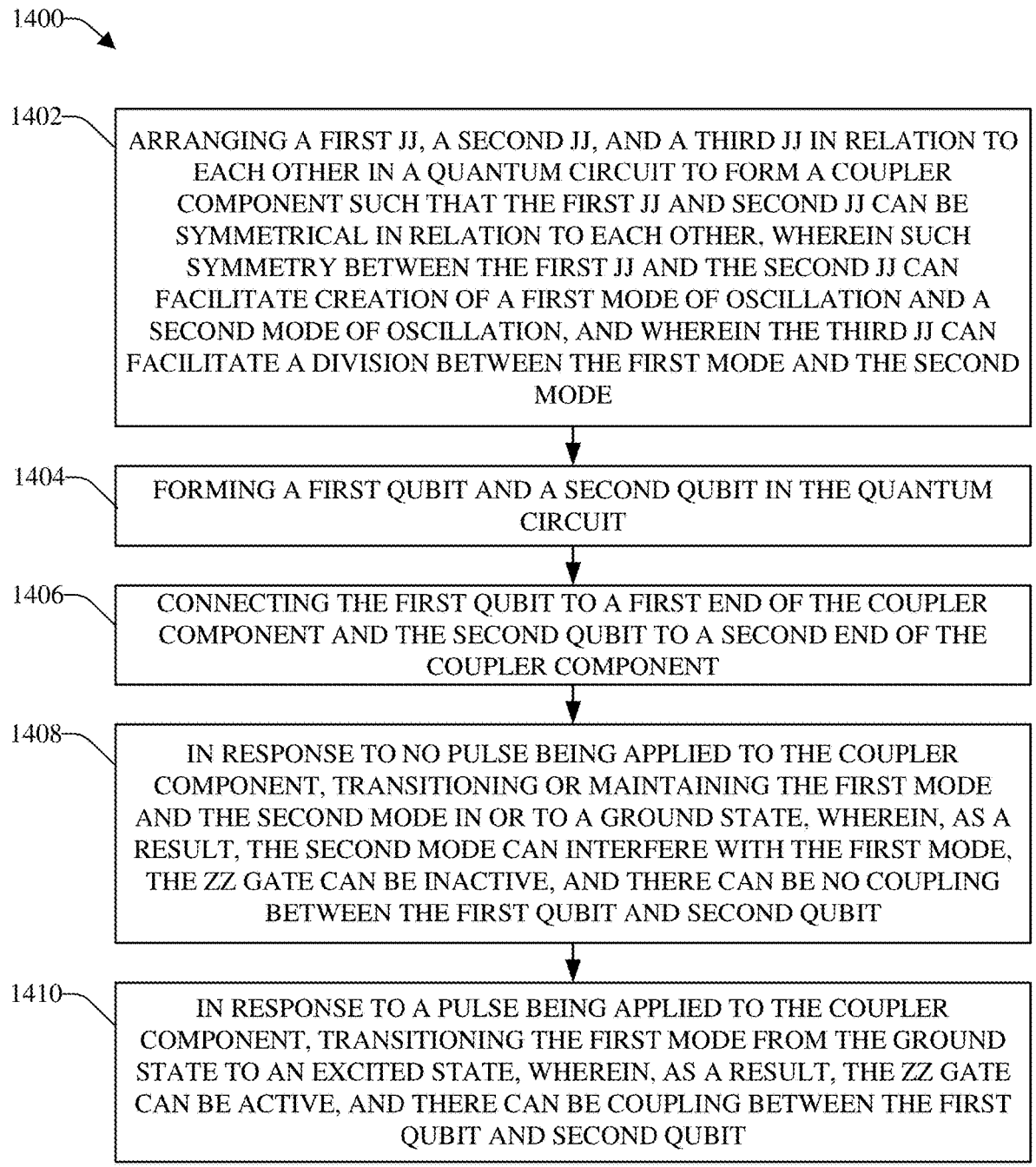
FIG. 14 depicts a flow diagram of an example, non-limiting method that can employ a multi-Josephson junction coupler component that can control a coupling between a first qubit and a second qubit, in accordance with various aspects and embodiments of the disclosed subject matter.

FIG. 14 depicts a flow diagram of an example, non-limiting method 1400 that can employ a multi-JJ coupler component (e.g., a facemon coupler component) that can control a coupling between a first qubit and a second qubit, in accordance with various aspects and embodiments of the disclosed subject matter. The method 1400 can be performed by, for example, a system (e.g., computer system) comprising or operatively coupled to a device formation component, a processor component, and/or a memory, and/or by the coupler component. Repetitive description of like elements employed in other embodiments described herein is or may be omitted for sake of brevity.

At 1402, a first JJ, a second JJ, and a third JJ can be arranged in relation to each other in a quantum circuit to form a coupler component such that the first JJ and second JJ can be symmetrical in relation to each other, wherein such symmetry between the first JJ and the second JJ can facilitate creation of a first mode of oscillation and a second mode of oscillation, and wherein the third JJ can facilitate a division between the first mode and second mode. The device formation component can form (e.g., fabricate) the coupler component (e.g., facemon coupler component employing a ZZ gate) to comprise the three JJs, and can structure, design, and/or arrange the first JJ and second JJ, in the quantum circuit, to be symmetrical, or at least substantially symmetrical, in relation to each other, and can arrange the third JJ in relation to the first and second JJs in the quantum circuit such that the third JJ can facilitate the division between the first mode and the second mode during operation of the coupler component, such as described herein and depicted in the drawings.

At 1404, a first qubit and a second qubit can be formed in the quantum circuit. The device formation component can form the first qubit and second qubit in the quantum circuit. In some embodiments, the first and second qubits can be transmon qubits.

At 1406, the first qubit can be connected to a first end of the coupler component, and the second qubit can be connected to a second end of the coupler component. The device formation component can connect the first qubit to the first end (e.g., first port or lead) of the coupler component, and can connect the second qubit to the second end (e.g., second port or lead) of the coupler component, in the quantum circuit. Via the coupler component, there can be a ZZ gate between the first qubit and second qubit. In some embodiments, the first mode of oscillation can be an even mode and the second mode of oscillation can be an odd mode (or vice versa) that can provide opposite signs of coupling between the first qubit and second qubit.

At 1408, in response to no pulse being applied to the coupler component, the first mode of oscillation and second mode of oscillation can be transitioned to or maintained in a ground state, and, as a result, the second mode of oscillation can interfere with the first mode of oscillation, the ZZ gate can be inactive, and there can be no coupling between the first qubit and second qubit. For instance, when no pulse is applied to the coupler component, the second mode of oscillation can interfere with the first mode of oscillation, which can cancel coupling, or at least substantially cancel coupling, between the first qubit and second qubit.

At 1410, in response to a pulse (e.g., RF or pi pulse) being applied to the coupler component, the first mode of oscillation can be transitioned from the ground state to an excited state, and, as a result, the ZZ gate can be active, and there can be coupling between the first qubit and second qubit. For instance, when the charge line in the quantum circuit applies the pulse to the coupler component, the first mode of oscillation can be transitioned from the ground state to the excited state, and an imbalance can be created between the first mode of oscillation and the second mode of oscillation. As a result, the ZZ gate can transition from the inactive state (e.g., closed state) to the active state (e.g., open state), and there can be coupling between the first qubit and second qubit.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 15:
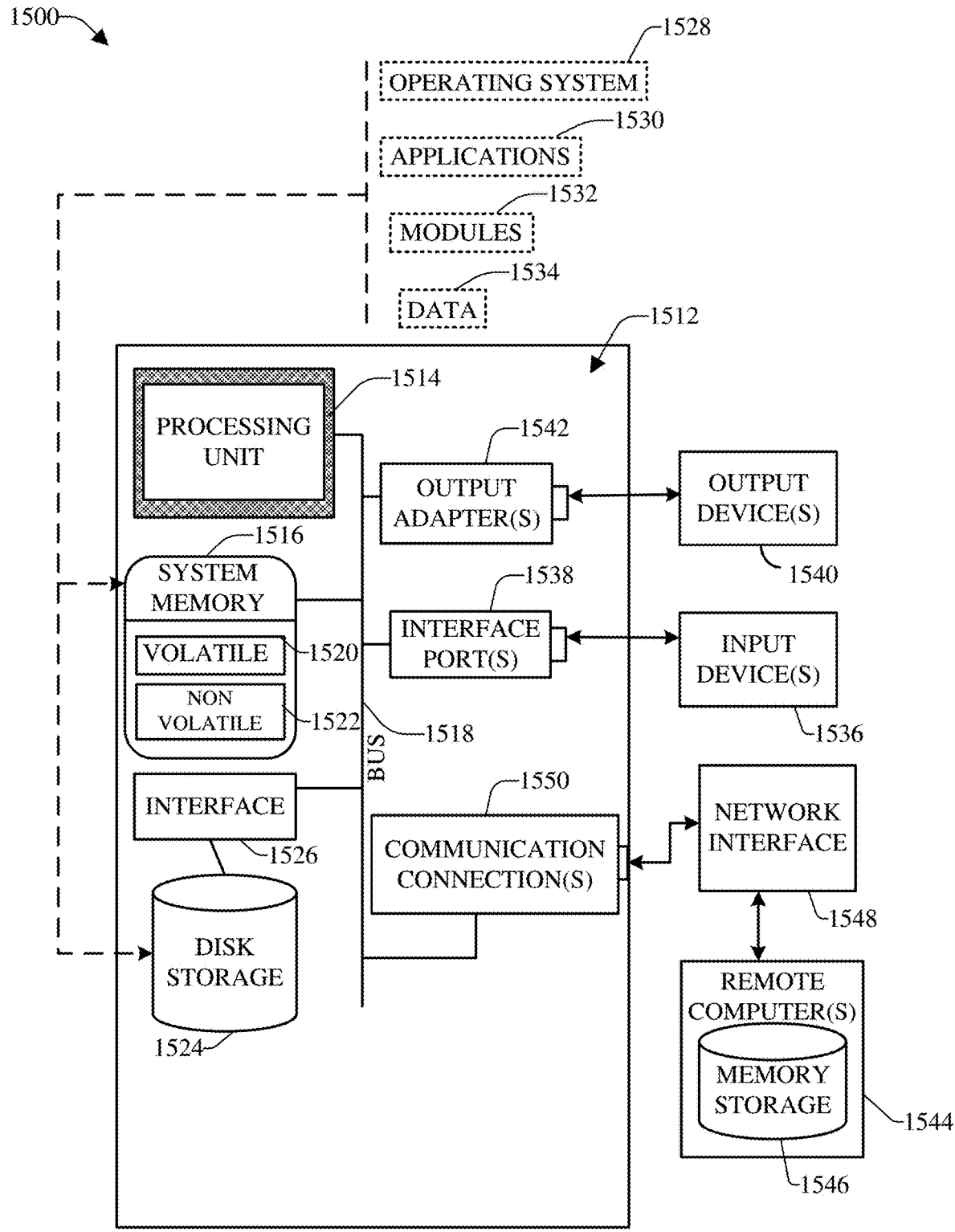
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is or may be omitted for sake of brevity. With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM).

Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512. System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a method of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a RAM, a ROM, an erasable programmable read-only memory (EPROM or Flash memory), a SRAM, a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile RAM (e.g., FeRAM). Volatile memory can include RAM, which can act as external cache memory, for example. By way of illustration and not limitation, RAM is available in many forms such as SRAM, DRAM, SDRAM, DDR SDRAM, ESDRAM, SLDRAM, DRRAM, DRDRAM, and RDRAM. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
    a first electronic element;
    a second electronic element; and
    a coupler component connected to the first electronic element and the second electronic element, wherein the coupler component comprises a first Josephson junction, a second Josephson junction, and a third Josephson junction associated with the first Josephson junction and the second Josephson junction in a quantum circuit,
    wherein, based on a relationship between the first Josephson junction, the second Josephson junction, and the third Josephson junction in the quantum circuit, the coupler component has a first mode of oscillation and a second mode of oscillation,
    wherein the first electronic element is connected to a fourth capacitive pad and is capacitively coupled to the coupler component via a first capacitive pad and the fourth capacitive pad, and
    wherein the second electronic element is connected to a fifth capacitive pad and is capacitively coupled to the coupler component via a second capacitive pad and the fifth capacitive pad.

2. The device of claim 1, wherein a geometry between the first Josephson junction and the second Josephson junction in the quantum circuit causes the first mode to have a first sign of coupling, and the second mode to have a second sign of coupling, with respect to the first electronic element and the second electronic element, and wherein the second sign is opposite of the first sign.

3. The device of claim 1, wherein the first Josephson junction and the second Josephson junction are substantially similar, and wherein the first Josephson junction is located between the first capacitive pad and a third capacitive pad, the second Josephson junction is located between the second capacitive pad and the third capacitive pad, and the third Josephson junction is located between the third capacitive pad and a ground element.

4. The device of claim 1, wherein a first frequency associated with the first mode or a second frequency associated with the second mode is defined based on a parameter associated with the third Josephson junction and a geometry between the first Josephson junction, the second Josephson junction, and the third Josephson junction in the quantum circuit.

5. The device of claim 1, wherein the first electronic element and the second electronic element are associated with a range of frequencies that is above a frequency of the coupler component.

6. The device of claim 1, wherein the first electronic element and the second electronic element are associated with a range of frequencies that is below a frequency of the coupler component.

7. The device of claim 1, wherein the coupler component is driven resonantly or diabatically via an on-resonant pulse.

8. The device of claim 1, wherein the first Josephson Junction is parallel to the first capacitive pad, and wherein the second Josephson Junction is parallel to the second capacitive pad.

9. The device of claim 1, wherein the coupler component has a third mode of oscillation that is associated with the third Josephson Junction.

10. A device, comprising:
a coupler component associated with a first quantum component and a second quantum component, wherein the coupler component comprises:
a Josephson junction; and
a resonator associated with the Josephson junction, wherein the Josephson junction is associated with a first mode of oscillation and the resonator is associated with a second mode of oscillation,
wherein the resonator comprises an inductor that is connected to the Josephson Junction, wherein the inductor is connected to a first capacitive pad and a seventh capacitive pad at a first end, and to a second capacitive pad and an eighth capacitive pad at a second end, and wherein the seventh capacitive pad and the eighth capacitive pad are connected to a ground element.

11. The device of claim 10, wherein the resonator is a lambda/4-type resonator, wherein the first mode is associated with a first sign of coupling and the second mode is associated with a second sign of coupling with respect to the first quantum component and the second quantum component, and wherein the second sign is different from the first sign.

12. The device of claim 10, wherein the Josephson junction is located between the first capacitive pad and the second capacitive pad, wherein the resonator is a lambda/4-type resonator, wherein the inductor of the lambda/4-type resonator is in parallel with the Josephson junction, wherein the lambda/4-type resonator is connected to the ground element, and wherein the lambda/4-type resonator is associated with a third capacitive pad and a fourth capacitive pad.

13. The device of claim 12, wherein the first quantum component is connected to a fifth capacitive pad and is capacitively coupled to the coupler component via the first capacitive pad and the fifth capacitive pad, and wherein the second quantum component is connected to a sixth capacitive pad and is capacitively coupled to the coupler component via the second capacitive pad and the sixth capacitive pad.

14. A method, comprising:
controlling excitation of a first oscillation mode of a coupler device based on whether a pulse is applied to the coupler device, wherein the coupler device comprises the first oscillation mode and a second oscillation mode that is in opposition to the first oscillation mode,
wherein the coupler device is electrically connected between a first quantum component and a second quantum component,
wherein the coupler device comprises a first Josephson junction, a second Josephson junction, and a third Josephson junction in a circuit, wherein the first Josephson junction and the second Josephson junction are substantially symmetrical,
wherein, based on the first Josephson junction and the second Josephson junction being substantially symmetrical, the first oscillation mode has a first sign of coupling and the second oscillation mode has a second sign of coupling with respect to the first quantum component and second quantum component, wherein the second sign is opposite of the first sign, and
wherein a division between the first oscillation mode and the second oscillation mode is based on a parameter associated with the third Josephson junction; and
controlling creation of a ZZ gate between the first quantum component and the second quantum component based on the controlling of the excitation of the first oscillation mode.

15. The method of claim 14, further comprising
applying the pulse to the coupler device;
in response to applying the pulse to the coupler device, creating the excitation of the first oscillation mode of the coupler device; and
in response to creating the excitation of the first oscillation mode, creating the ZZ gate between the first quantum component and second quantum component.

16. The method of claim 14, wherein, in response to no pulse being applied to the coupler device, a ZZ interaction or a coupling between the first quantum component and the second quantum component is suppressed.

17. The method of claim 14, wherein the parameter is a first parameter, wherein a fourth Josephson junction is connected in parallel with the second Josephson junction in the circuit, wherein a coil component is in proximity to the second Josephson junction and the fourth Josephson junction in the circuit, and wherein the method further comprises:
supplying a current to the coil component;
in response to the current supplied to the coil component, generating a magnetic flux;
applying the magnetic flux to the second Josephson junction or the fourth Josephson junction; and in response to applying the magnetic flux, adjusting a second parameter associated with the second Josephson junction.

18. The method of claim 14, wherein the coupler device is driven resonantly or diabatically via the pulse, wherein the pulse is an on-resonant pulse.

19. A system, comprising:
a first qubit;
a second qubit; and
a coupler device associated with the first qubit and the second qubit, wherein the coupler device comprises a first mode of oscillation and a second mode of oscillation, wherein an activation status of a ZZ gate between the first qubit and the second qubit is managed based on an excitation status of the first mode and a relationship between the first mode and the second mode, wherein the excitation status is based on whether a pulse is applied to the coupler device, and
wherein the coupler device comprises a first Josephson junction, a second Josephson junction, and a third Josephson junction in a circuit, wherein the first Josephson junction and the second Josephson junction are substantially symmetrical,
wherein, based on the first Josephson junction and the second Josephson junction being substantially symmetrical, the first mode has a first sign of coupling and the second mode has a second sign of coupling with respect to the first qubit and second qubit, wherein the second sign is opposite of the first sign, and
wherein a division between the first mode and the second mode is based on a parameter associated with the third Josephson junction.

20. The system of claim 19,
wherein the first mode and the second mode are based on the first Josephson junction and the second Josephson junction being substantially symmetrical and based on the parameter associated with the third Josephson junction.

21. The system of claim 19, wherein the pulse is a radio frequency pulse, wherein, in response to the radio frequency pulse being applied to the coupler device, the first mode is excited, and wherein, based on the first mode being excited, the ZZ gate between the first qubit and the second qubit is activated, enabling a ZZ interaction or a coupling between the first qubit and the second qubit.

22. The system of claim 19, wherein the pulse is a radio frequency pulse, and wherein the coupler device is driven resonantly based on the radio frequency pulse applied to the coupler device.

23. The system of claim 19, wherein, in response to no pulse being applied to the coupler device, the first mode and the second mode are in a non-excited state, and wherein, based on the first mode and the second being in the non-excited state, the ZZ gate is inactive and a ZZ interaction or a coupling between the first qubit and the second qubit is suppressed.

24. The system of claim 19, wherein the coupler device is driven resonantly or diabatically via the pulse, wherein the pulse is an on-resonant pulse.

25. A system, comprising:
a coupler component associated with a first electronic element and a second electronic element, wherein the coupler component comprises:
a first coupler element; and
a second coupler element, wherein the first coupler element and the second coupler element are substantially symmetrical, wherein the coupler component comprises the first coupler element, the second coupler element, and a third coupler element in a circuit, and
wherein the coupler component comprises a first mode associated with a first frequency and a second mode associated with a second frequency,
wherein the second mode is able to be in opposition to the first mode based on a relationship between the first coupler element and the second coupler element,
wherein, based on the first coupler element and the second coupler element being substantially symmetrical, the first mode has a first sign of coupling and the second mode has a second sign of coupling with respect to the first electronic element and second electronic element, wherein the second sign is opposite of the first sign, and
wherein a division between the first mode and the second mode is based on a parameter associated with the third coupler element.

* * * * *